May 8, 1962 G. C. CURRIE, JR., ETAL 3,032,945
CAN PACKING APPARATUS
Original Filed Feb. 5, 1959 13 Sheets-Sheet 1
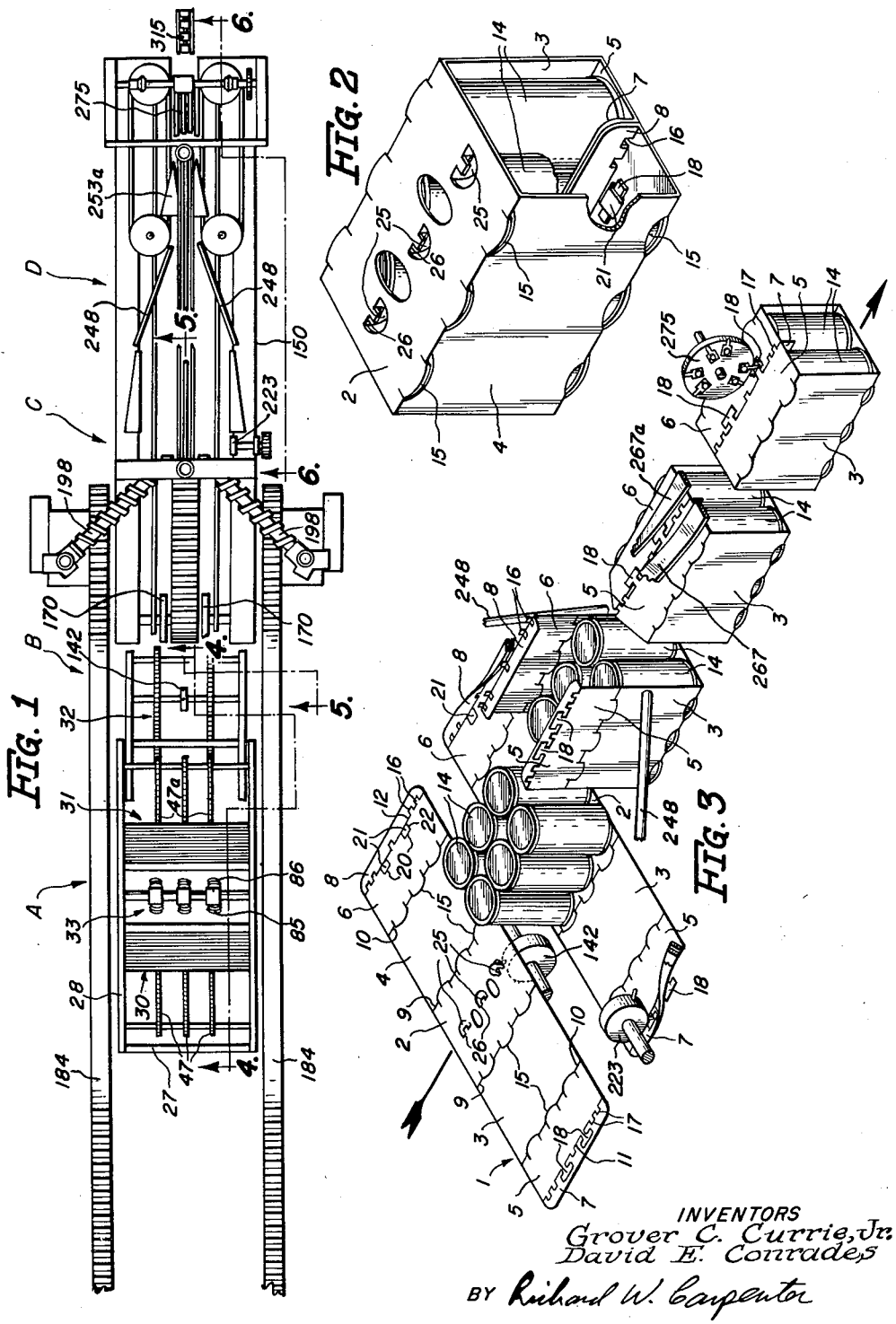
INVENTORS
Grover C. Currie, Jr.
David E. Conrades
BY Richard W. Carpenter
ATTORNEY

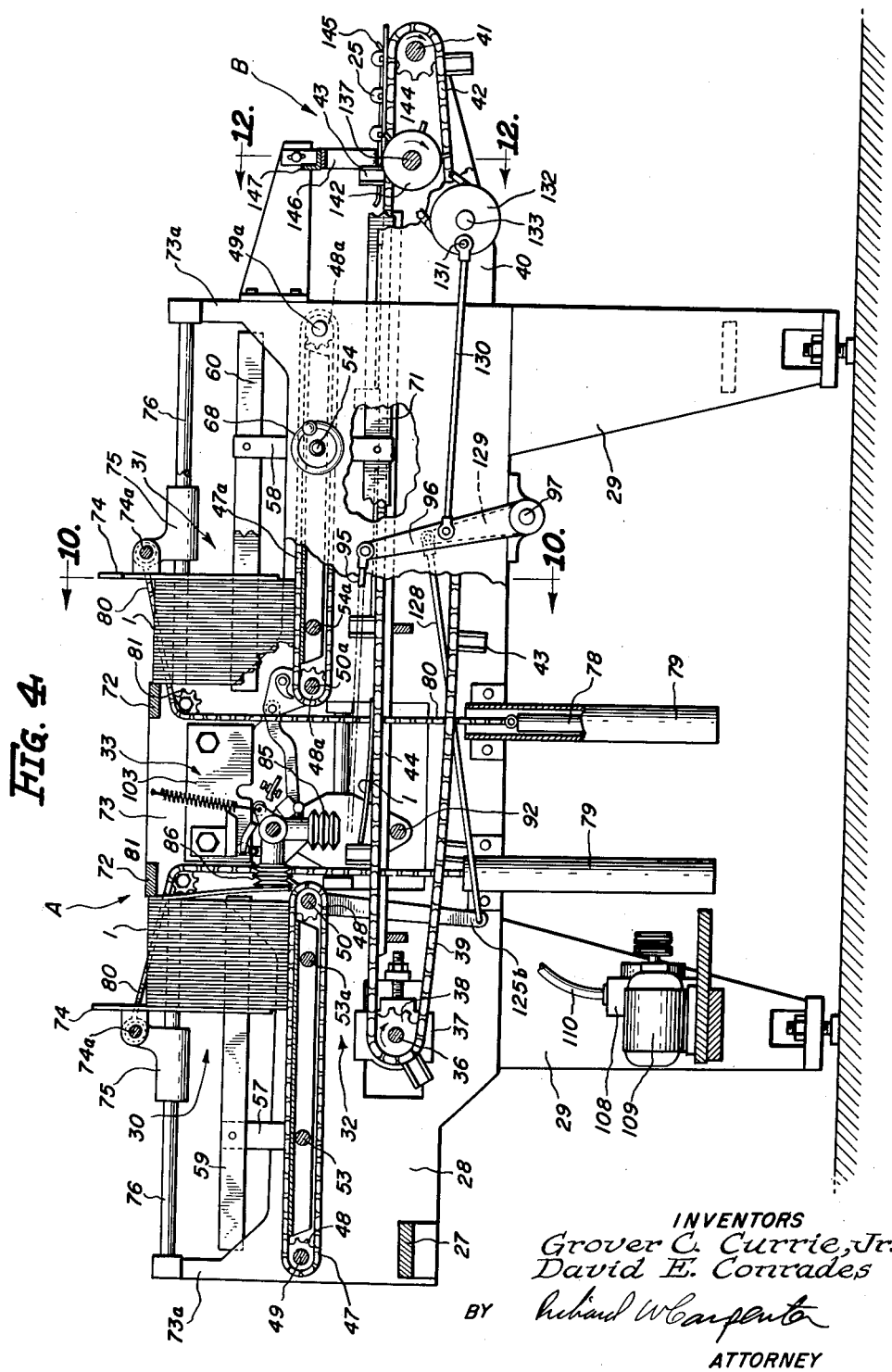

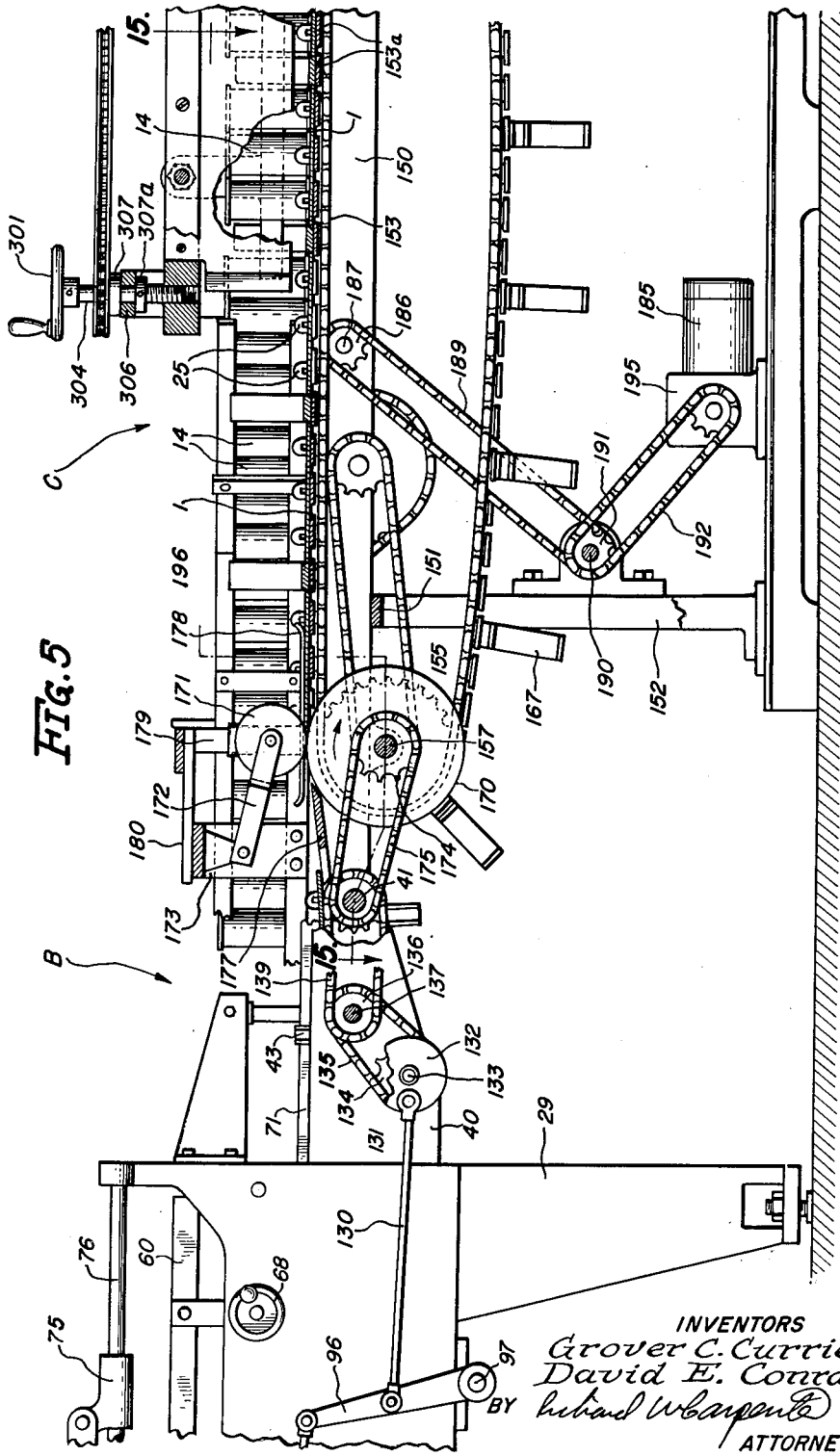

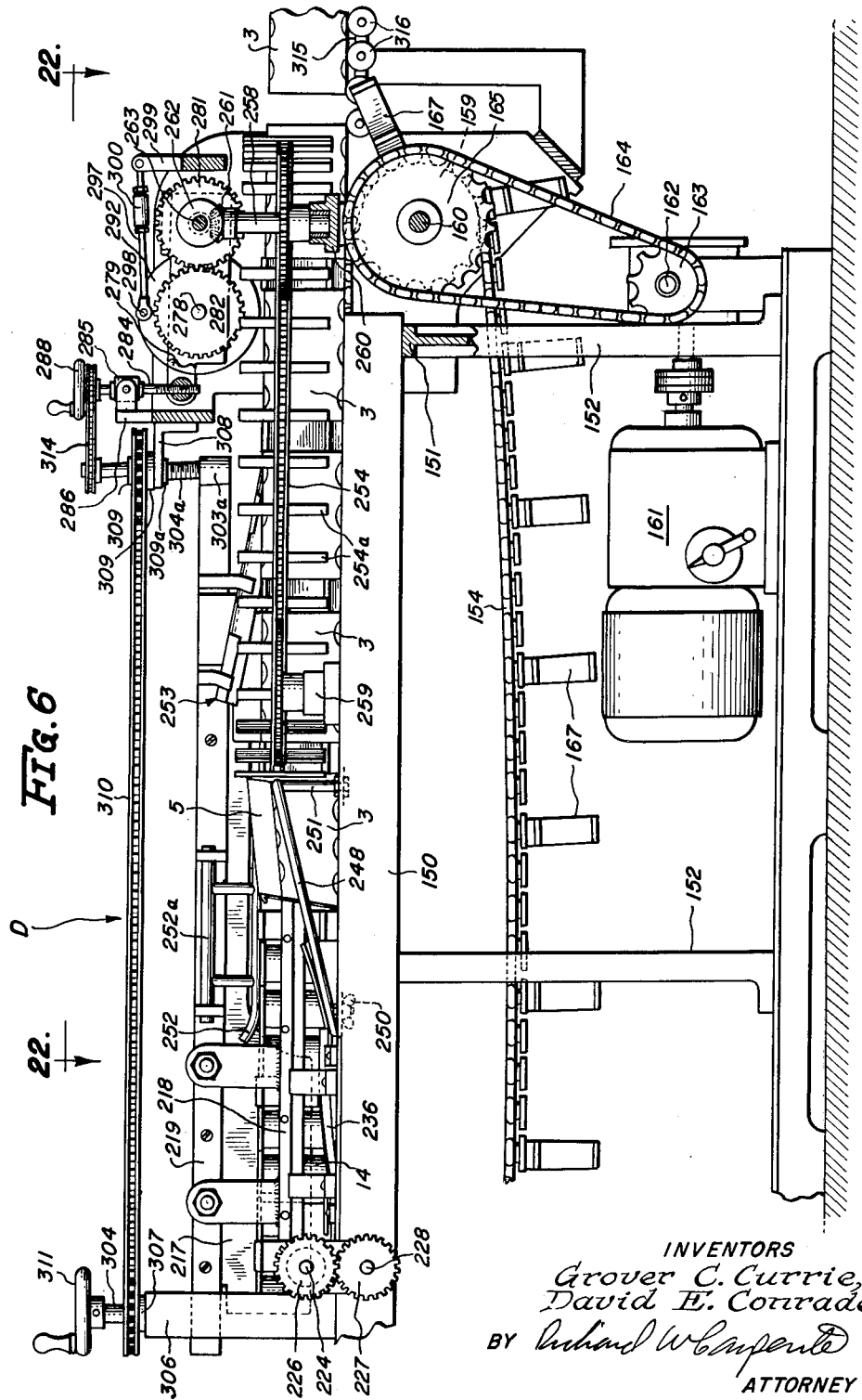

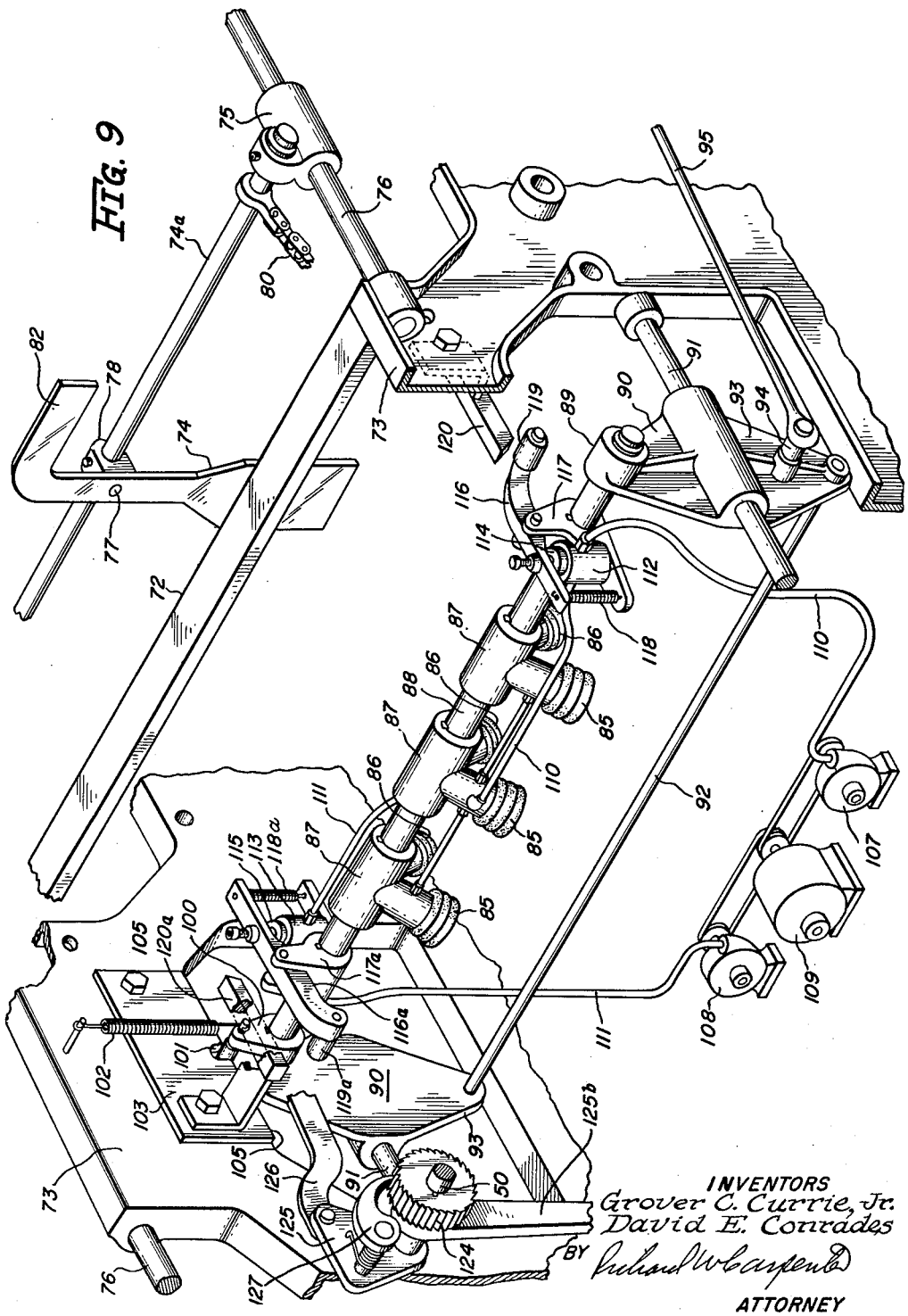

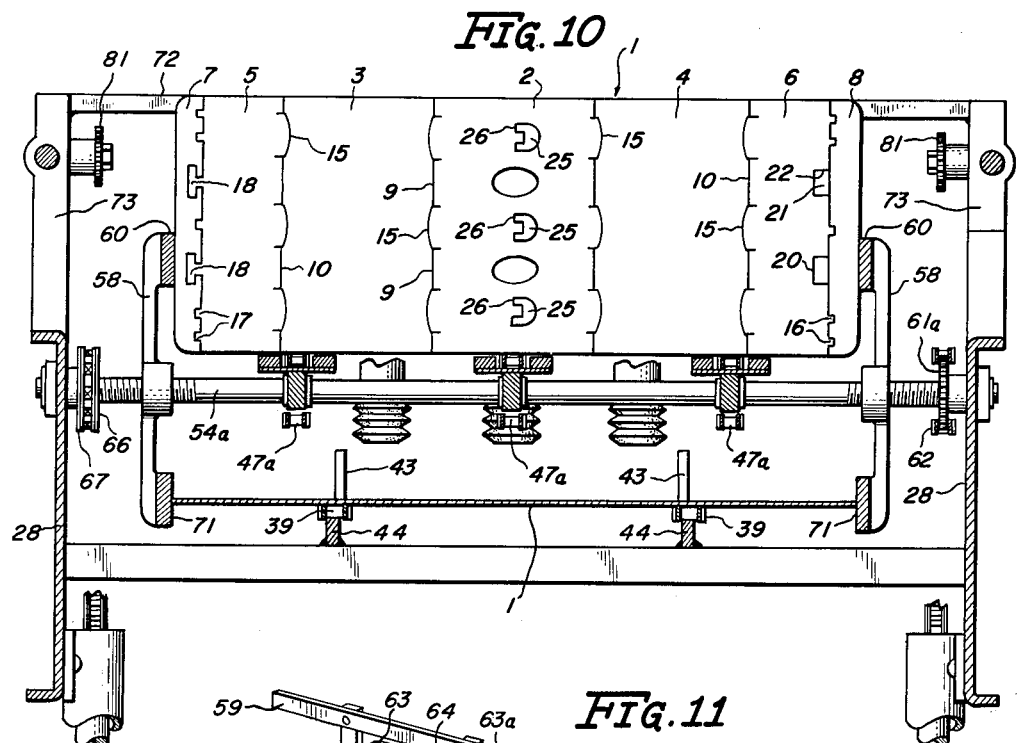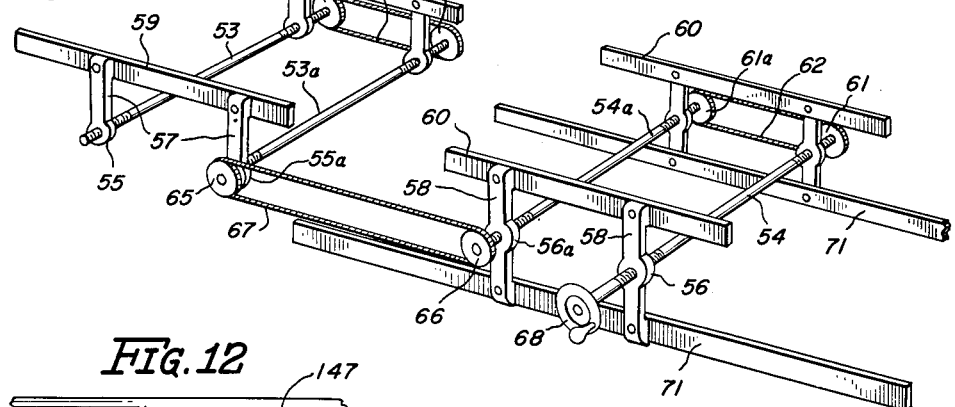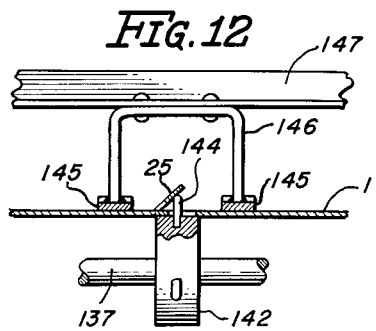

May 8, 1962 G. C. CURRIE, JR., ETAL 3,032,945
CAN PACKING APPARATUS
Original Filed Feb. 5, 1959 13 Sheets-Sheet 8
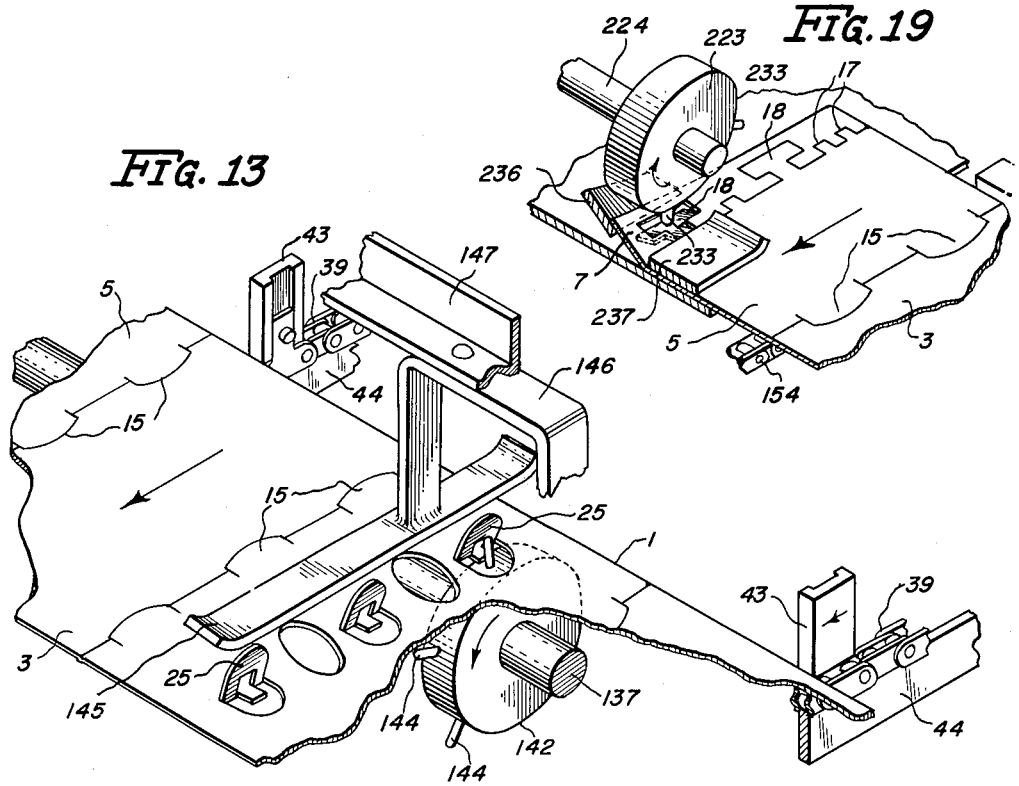
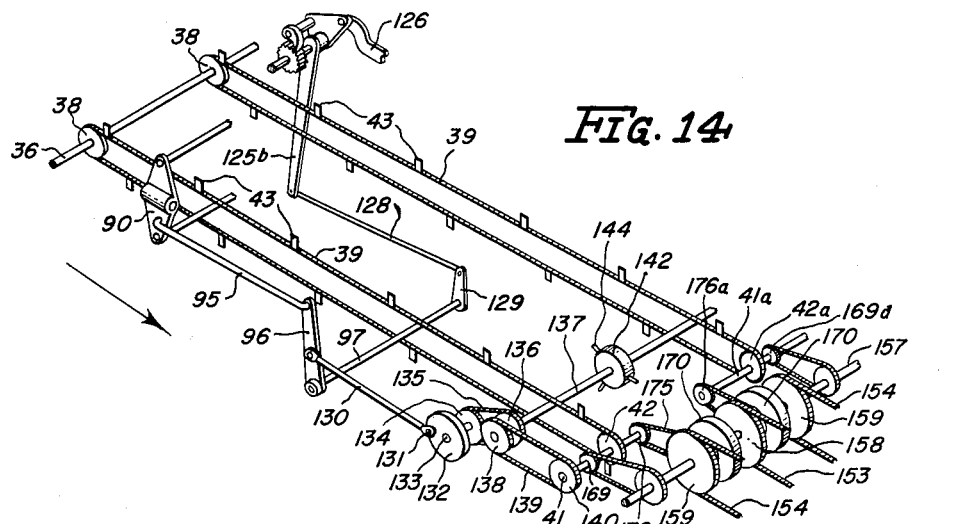
INVENTORS
Grover C. Currie, Jr.
David E. Conrades
BY
ATTORNEY

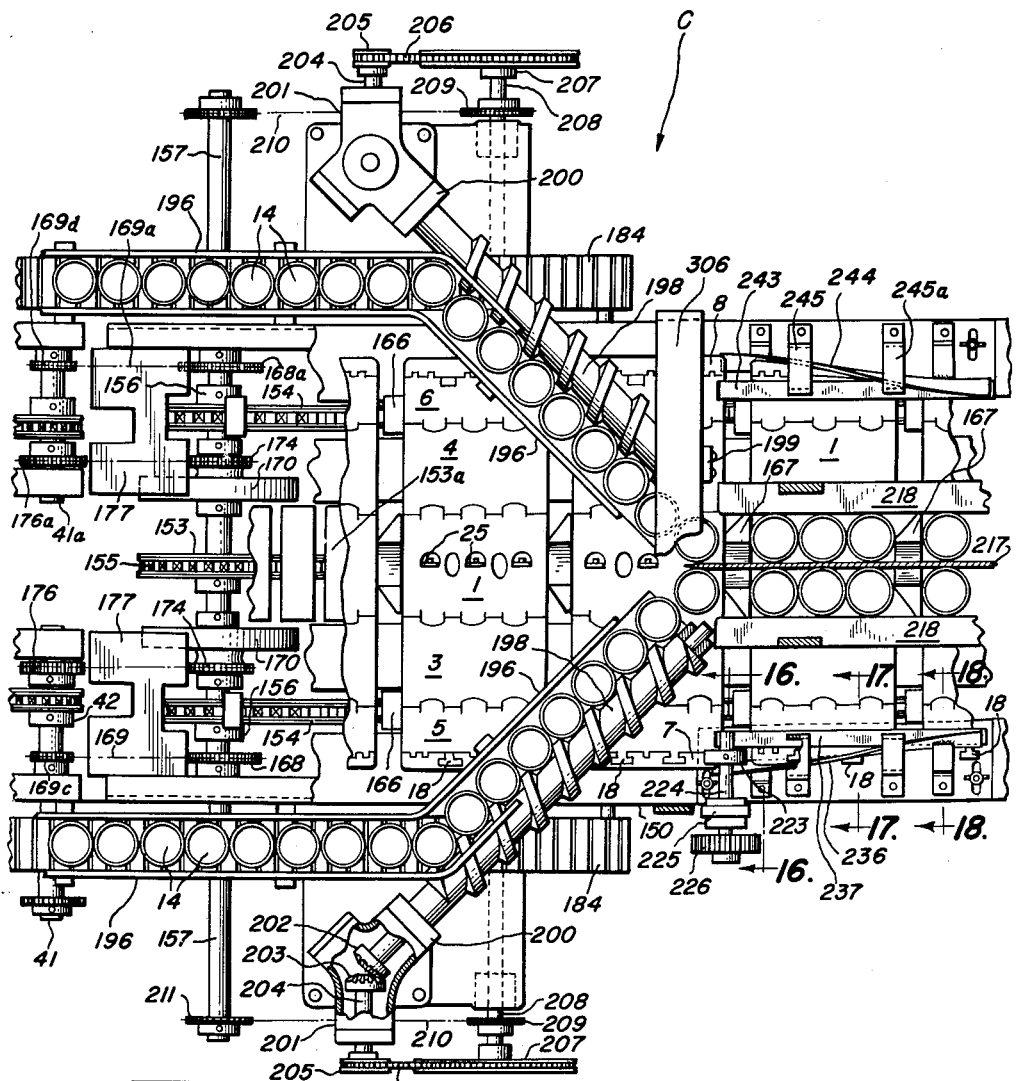

May 8, 1962   G. C. CURRIE, JR., ET AL   3,032,945
CAN PACKING APPARATUS
Original Filed Feb. 5, 1959   13 Sheets-Sheet 10
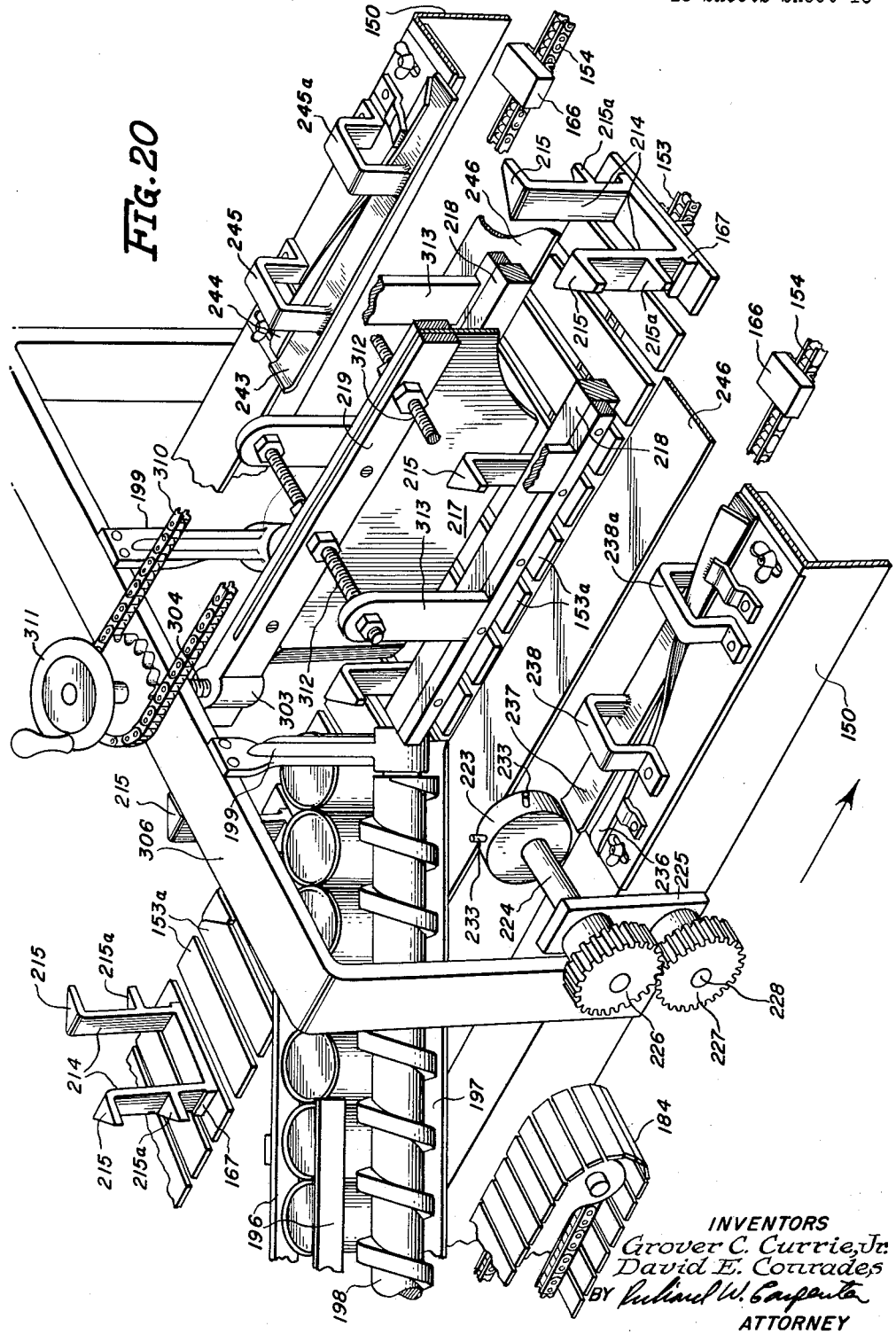
INVENTORS
Grover C. Currie, Jr.
David E. Conrades
BY
ATTORNEY

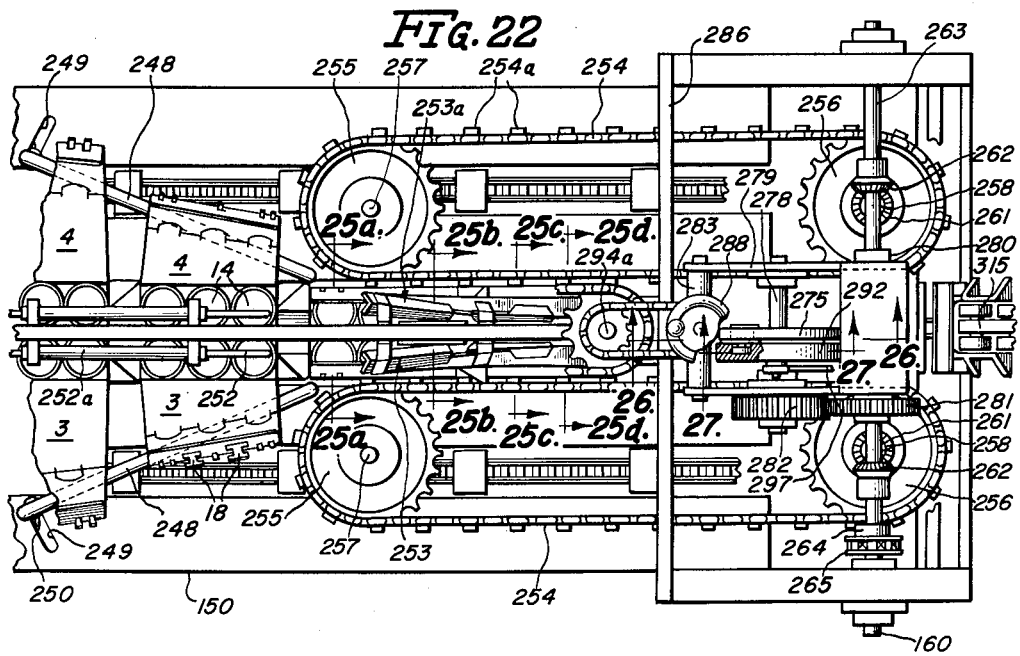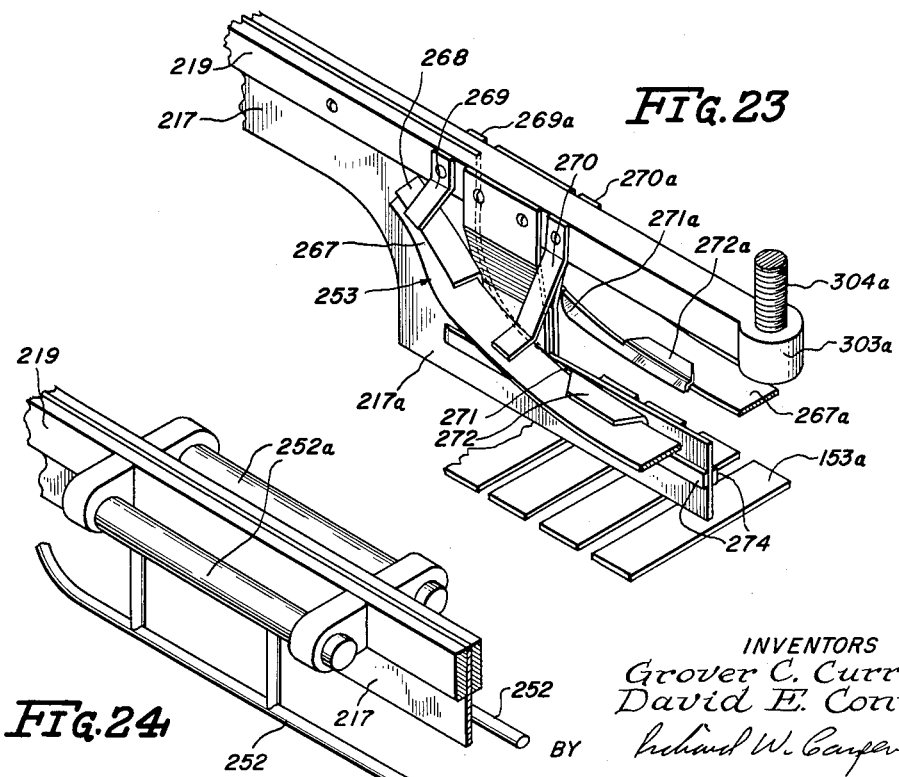

May 8, 1962 G. C. CURRIE, JR., ETAL 3,032,945
CAN PACKING APPARATUS
Original Filed Feb. 5, 1959 13 Sheets-Sheet 13
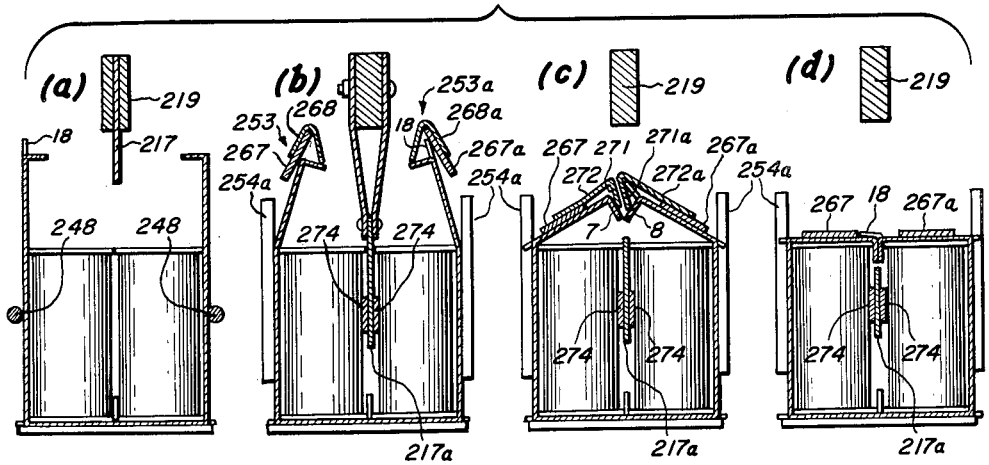
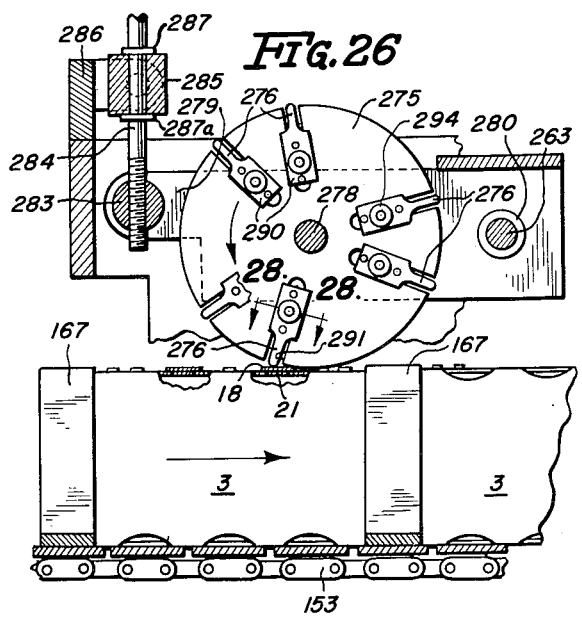
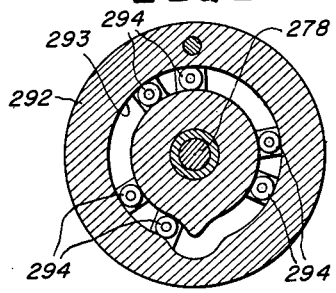
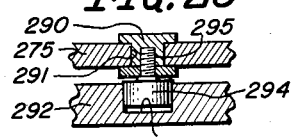
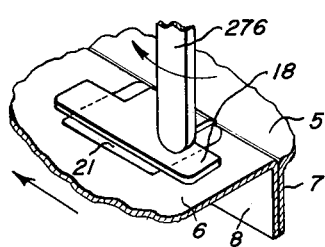
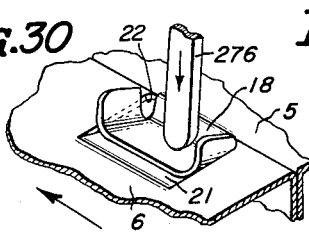
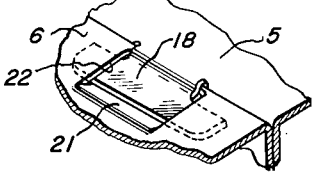
INVENTORS
Grover C. Currie, Jr.
David E. Conrades
BY Richard W. Carpenter
ATTORNEY 3,032,945
CAN PACKING APPARATUS
Grover C. Currie, Jr., and David E. Conrades, Charlotte, N.C., assignors to Container Corporation of America, Chicago, Ill., a corporation of Delaware
Original application Feb. 5, 1959, Ser. No. 791,298. Divided and this application Aug. 26, 1960, Ser. No. 56,616
8 Claims. (Cl. 53—48)

The present invention relates to mechanism for enclosing groups of cans within cartons of the wrap-around type, and more specifically relates to mechanism for forming packages of cans in such cartons in a continuous operation.

This application is a divisional application of our copending application Serial No. 791,298 filed February 5, 1959.

The mechanism of the present invention is designed for use with open end wrap-around carriers of the type which may be delivered to the packer in the form of an elongated, flat blank having end portions adapted to be interengaged when brought together around a group of cans.

Among the important objects of the invention are to enclose groups of cans, or similar articles, rapidly and efficiently within an open-end wrap-around carton; to provide a unitary, high-speed blank-feeding means that will deliver carton blanks effectively to a wrapping station to which a continuous supply of cans is delivered; to provide improved and efficiently operating means for conditioning interlocking parts in the end portions of the blank so that when the blanks are wrapped around the cans and the parts of the carton are brought into interlocking relation, such locking parts may readily be interengaged; to provide improved and simplified means for effecting engagement of the interlocking parts at the ends of the carton blank; and generally to improve the construction and operation of this type of mechanism.

An additional object is to provide effective adjusting means by which the mechanism of the present invention may be adjusted quickly and accurately to accommodate carton blanks of varying lengths for packaging different sizes of cans or similar articles.

In the drawings:

FIG. 1 is a somewhat schematic plan view of a machine constructed in accordance with the present invention;

FIG. 2 is a perspective view on an enlarged scale of a wrap-around carton of the type which may be used with the mechanism herein disclosed, such carton being shown as enclosing a group of six cans;

FIG. 3 is a schematic view in perspective showing various steps in treating the blank, wrapping it around a group of cans and securing the locking parts of the carton to retain the carton in can retaining condition;

FIG. 4 is a partial sectional view taken along line 4—4 of FIG. 1, showing the carton blank storage magazines and conveyor with carton blank delivery means for delivering blanks from the magazines to the feeding conveyor, and also showing a star wheel means for raising tabs which maintain cans in adjacent rows in separated relation;

FIG. 5 is a partial sectional view taken along line 5—5 of FIG. 1, illustrating the mid-section of the machine and showing the relationship of the feeding conveyor for the blanks and the main conveyor;

FIG. 6 is a partial sectional view taken along line 6—6 of FIG. 1, showing the portion of the machine adjacent its discharge end along which the ends of the blanks are folded up and over the can groups;

FIG. 9 is a fragmentary perspective view with certain parts removed showing details of the structure for controlling the movement of the suction cups and controlling their connection with the vacuum pumps;

FIG. 10 is a detail sectional view taken along line 10—10 of FIG. 4, looking in the direction of the arrows, showing the supporting conveyor and adjustable side bars of one of the carton blank magazines;

FIG. 11 is a somewhat schematic perspective view showing the mechanism for effecting simultaneous in and out adjustment of the carton magazine side bars to accommodate blanks of different lengths;

FIG. 12 is a fragmentary detail sectional view taken along line 12—12 of FIG. 4, showing stripping means for folding upward the tabs formed along the center of the blank which separate the cans in adjacent rows;

FIG. 13 is a fragmentary perspective view showing a blank passing beneath a hold-down bar and showing how the star wheel folds the separating tabs upwardly;

FIG. 14 is a schematic perspective view showing the driving means for the feeding conveyor and the connection between such conveyor and the main conveyor;

FIG. 15 is a fragmentary plan view, partially in section, taken along line 15—15 of FIG. 5, showing details of the conveyor drive and showing the feeding of groups of cans into position on the flat blanks;

Figure 21:
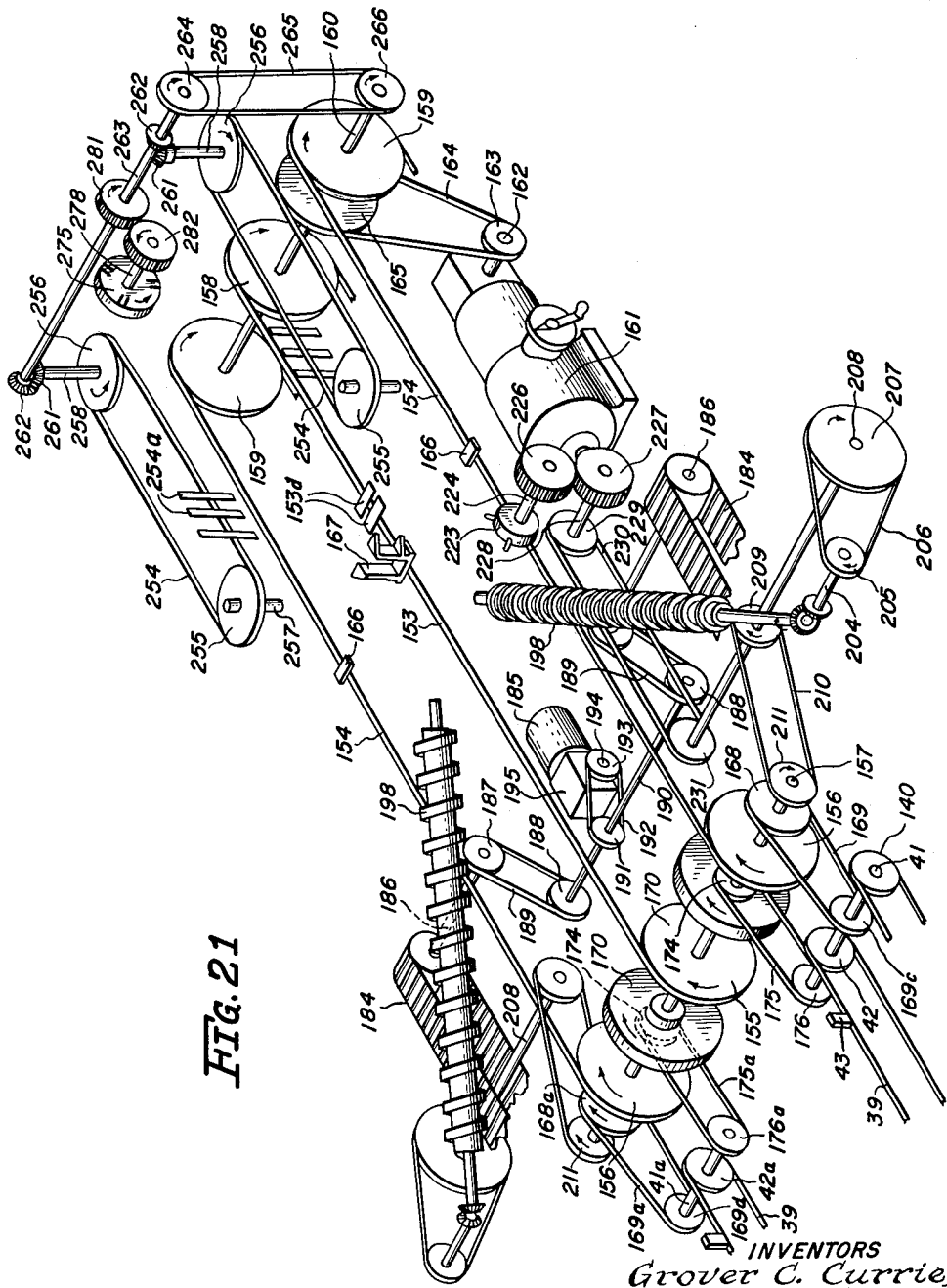

FIGS. 16, 17 and 18 are detail sectional views taken along lines 16—16, 17—17 and 18—18 respectively of FIG. 15, showing how the T-shaped locking tabs are held in stripped out position and the end portion of the blank is folded over the plow element as the cartons are advanced;

FIG. 19 is a fragmentary, detail perspective view showing the second stripping wheel operating to deflect the T-shaped locking tabs from their original position in the plane of the blank;

FIG. 20 is a fragmentary perspective view showing various operating parts in their relation to the main conveyor with the cartons omitted for sake of clarity in illustrating the machine parts;

FIG. 21 is a schematic perspective view to illustrate the transfer mechanism between the feeding and main conveyors and driving means for the conveyors and other mechanism;

FIG. 22 is a fragmentary plan view illustrating the portion of the machine adjacent its discharge end showing among other features the plow means for folding the carton and the holding means or squeeze members to hold the vertical sides of the carton firmly against the can group;

FIG. 23 is a fragmentary detail perspective view showing the folding plow for the top closure panels of the carton;

FIG. 24 is a detail view showing the construction and mounting of the can hold-down device;

FIGS. 25(a), (b), (c) and (d) are fragmentary sectional views taken along lines 25(a), 25(b), 25(c) and 25(d) respectively in FIG. 22, looking in the direction of the arrows, showing progressive stages in folding the carton closure flaps into final position;

FIG. 26 is a fragmentary detail sectional view taken along line 26—26 of FIG. 22 to show the construction and operation of the tuck and lock mechanism for forcing the T-shaped locking tabs into openings in the opposite carton closure;

FIG. 27 is a fragmentary detail sectional view taken on line 27—27 of FIG. 22 showing the cam element for the tuck and lock mechanism;

FIG. 28 is a fragmentary detail sectional view taken on line 28—28 of FIG. 26, through one of the tuck and lock fingers; and FIGS. 29, 30 and 31 are fragmentary detail perspective views showing progressively the operation of forcing the T-shaped locking tab through its cooperating locking opening.

In its essentials the mechanism embodying the present invention comprises a suitable elongated frame which carries two aligned, flat carton blank supply magazines, a feeding conveyor for receiving the flat blanks, suction cup delivery mechanism for delivery of blanks alternately from the magazines to the feeding conveyor, a main conveyor for receiving flat blanks from the feeding conveyor and for maintaining the blanks properly spaced, a pair of can conveyors, one on each side of the main conveyor, connect with inwardly converging conveyors serving to bring groups of cans into position on the center panel of each of the flat blanks. Stripper devices are provided, one of which folds upwardly suitable center tabs, to separate the cans of one row from the cans in the adjacent row. Additional stripper devices act to deflect outwardly the T-shaped locking tabs. Plow means are provided for folding upwardly narrow panels at each end of the blank, these panels being adapted to be received between the two rows of cans in the completed package. Additional plow means on the frame serve to fold inwardly the side and top panels of the cartons and bring the panels with the locking parts down flat against the tops of the cam groups preparatory to the locking operation. Tuck and lock means are provided for forcing the T-shaped locking tabs into the appropriate openings of the blank to complete the can packages.

Referring more particularly to the drawings, the machine as a whole may be seen in plan view in FIG. 1, and in side elevation by placing FIGS. 4, 5 and 6 in line. The complete machine comprises a carton storage and feeding section, or station, designated at A; a tab stripping section, or station, designated at B; a transfer and can receiving section, or station, C where the flat blanks are properly spaced and their central panels supplied with a group of six cans arranged in two rows of three cans each, and additionally a second stripping operation is carried out in which the locking tabs of the carton are deflected downward; and a final section, or station, D, somewhat overlapping section C, in which the parts of the blank are folded by plow means, first to fold a narrow strip along each of the ends and later to fold the panels of the carton up against the sides of the can group, then over and down against the tops of the cans, and in which the locking parts of the carton are engaged to complete the can package.

The construction of the can package may be understood by referring to FIGS. 2 and 3. Elongated, flat blank 1 are cut and creased to provide a central panel 2, side panels 3 and 4, top panels 5 and 6 and narrow panels 7 and 8 at the extremities of the blank. The principal panels are foldable along crease lines 9, 9 and 10, 10 and the narrow panels 7 and 8 are foldable along crease lines 11 and 12. In order to assist in the retention of cans 14, 14 within the carton cuts 15 are formed in the carton at the fold lines. These cuts have an arcuate central portion which joins with straight slits. When the panels are folded into tubular form openings are provided for the accommodation of a portion of the can contour adjacent the can chime. The crease lines 9 and 10 are interrupted so they do not pass through the portions at the arcuate cuts whereby rigid tabs are formed that substantially conform to the can ends.

A number of small, rigid tabs 16 and 17 are provided along the crease lines 11 and 12 by making small U-shaped cuts terminating at the crease lines, which are interrupted across the cuts. As shown in FIG. 3 the tabs 16 are adapted to be flat on the edge of panel 6 when the carton is brought to final tubular condition. The tabs 17 are insertable in the openings formed by cutting the tabs 16. It is to be noted that the narrow panels 7 and 8 are folded to lie against each other and extend inwardly of the carton to form a separator between the rows of cans.

Locking means are provided to join the panels 5 and 6. For this purpose T-shaped tabs 18, 18 are formed by cuts in the narrow panel 7. These locking tabs are hinged at the crease line 11. Locking openings are formed in the panel 6 by U-shaped cuts which extend inward of the panel and terminate at a crease line 20. The tabs 21 thus formed are readily foldable to facilitate inward swinging of the tabs to provide locking openings 22 to receive the T-shaped tabs. It is not required to have the tabs 21, as a clear opening would suffice. The tabs do not interfere with the locking operation and simplify the carton production, as a stripping out operation is avoided. It is to be noted the locking tabs are formed in the blank at a position where they will register with the open spaces left between the two rows of cans.

In order to separate the can rows at the can ends opposite those separated by narrow panels 7 and 8, there are provided in panel 2 three inwardly foldable tabs 25, 25. These tabs are preferably formed by making U-shaped cuts, the open ends of which terminate in crease lines 26. In the final form of the package each of the tabs 25, when folded inwardly, separates a pair of cans in the adjacent rows. It may also be noted at this point that in general practice the carton blanks will be pointed so that panel 2 constitutes the top of the package and panels 5 and 6 constitute the bottom. In the interest of simplicity of description the panels 5 and 6 will be referred to as top panels and the panel 2 will be referred to as the bottom panel, since that is the most convenient way of forming the package.

*Carton Storage and Feeding*

For convenience the carton storage and feeding mechanism may be mounted on a base frame separate from other frame parts of the machine. This may comprise main frame members 27 and 28 mounted on legs 29, 29. Carried on this frame are the two carton blank magazines indicated as a whole at 30 and 31, the feeding conveyor, indicated as a whole at 32, the blank delivery device, indicated as a whole at 33, and the stripper mechanism, previously referred to, indicated at B.

The carton feeding conveyor will now be described. See FIGS. 1, 4, 5, 14 and 21. A shift 36 mounted in adjustable bearings 37 near the end of the machine carries a pair of sprockets 38, 38 over which pass endless chains 39, 39. The discharge end of the conveyor is supported on a frame extension 40 which carries bearings supporting a pair of aligned, spaced shafts 41 and 41a on which are secured sprockets 42, 42a over which the chains 39, 39 pass (see FIG. 14). Spaced pusher elements 43, 43 are secured on the chains to carry forward the carton blanks when deposited on the conveyor. The spacing of the pusher elements 43 is somewhat greater than the blank width for a purpose which will be explained below. Suitable rails 44, 44 are provided below the chains 39 to keep them supported between the sprockets.

The carton blank magazines are preferably located in alignment with the feeding conveyor and a short distance above the conveyor. These magazines are substantially identical and each comprises, as herein shown, three spaced, endless sprocket chains 47 and 47a respectively passing over sprockets 48 and 48a respectively, carried on shafts 49, 50 and 49a and 50a respectively. Separate groups of carton blanks are supported on the conveyor chains 47 and 47a and such chains are designed to be advanced step-by-step as will be later described. Suitable rails are supported beneath the chains and between the end sprockets to keep the chains from sagging.

As shown in FIGS. 10 and 11, adjustable side bars are provided to guide the ends of the blanks and assure their proper positioning on the feeding conveyor. For this purpose rods 53, 53a and 54, 54a have their ends journalled in bearings in upstanding portions of side frame members 28, 28. These rods have portions near each end threaded so as to be received into interiorly threaded bosses 55, 55a and 56, 56a of upwardly projecting bracket supports indicated at 57, 57 and 58, 58 which respectively carry side guide bars 59, 59 and 60, 60. The ends of threaded rods 54 and 54a have sprockets 61 and 61a keyed thereon over which passes a sprocket chain 62. Likewise rods 53 and 53a have sprockets 63 and 63a keyed thereon over which passes a chain 64. Rods 53a and 54a have sprockets 65 and 66 at their ends opposite the first mentioned sprockets. Chain 67 passes over these latter sprockets. A crank wheel 68 is secured on rod 54 to enable this rod to be rotated manually. All of the sprockets on the threaded rods are of the same size. Thus, by rotating rod 54 by the crank wheel, all of the threaded rods may be rotated in unison and the guide bars 59, 59 and bars 60, 60 move in symmetry outwardly or inwardly a uniform distance, thereby to accommodate the blank magazines for retention of blanks of different lengths.

The bracket supports 58, 58 have depending portions to which are secured guide bars 71, 71 which serve to guide the ends of the blanks as they are carried on the feeding conveyor chains 39, 39. See FIG. 10.

At the front or delivery points of each magazine there is supported a stationary bar 72 against which the upper edge of the leading blank may bear until such blank is withdrawn from the magazine as described below. These stationary bars are secured upon upstanding frame sections 73, 73 carried by side frame members 28.

The groups of blanks in the magazines are each supported by a follower plate 74 (see FIGS. 4 and 9) supported on a rod 74a having its ends fixed in bosses on carriage members 75 slidable along rods 76, 76 with one end supported in the frame section 73 and the other end supported in another frame section 73a. The follower plate is preferably mounted for swinging movement in a plane parallel with the blanks it supports. For this purpose the plate is pivoted on a pin 77 supported in a bracket element 78 keyed to the rod 74a. When it is desired to place additional blanks in one of the magazines such blanks may be placed at the rear of the follower plate. The plate may then be swung laterally while the additional blanks are supported by hand. The rod 74a supporting the follower plate is then moved rearward to clear the new supply. The follower plate is then swung back in the rear of such new supply.

Each follower plate is urged forwardly, or in the direction of the discharge point of the magazine, by a pair of counterweights 78 each slidable in a housing 79 on the frame member 28. The counterweights are suspended on chains 80 passing over idler sprockets 81 on the frame section 73 and having the ends connected near the opposite ends of the rod 74a.

The upper end of the follower plate may have a horizontally disposed handle portion 82 at its upper end above the pin 77 for greater ease in swinging the follower plate laterally.

Vacuum Cup Delivery Mechanism

The blank delivery mechanism as herein shown (see FIGS. 4, 7, 8, 9 and 14) is located in the space between the delivery points of the magazines 30 and 31. Two angularly positioned vacuum cups are mounted for both reciprocal and oscillating movements to bring first one cup and then the other into engagement with the foremost blank in the opposite magazines. The vacuum cups each engage a blank alternately and deposit the blank on the feeding conveyor. Thus, while the speed of reciprocation and oscillation of the vacuum cup support is relatively moderate, the blanks may be delivered in quick succession to the feeding conveyor.

The vacuum cups are preferably in two groups of three cups each designated at 85 and 86. See FIG. 9. The need for a plurality of identically operable cups in the present instance is due to the elongation of the blanks which are to be handled. In effect each group of three cups acts as a single cup and at times will be so described for simplicity. The two groups of cups are in the present instance mounted at right angles to each other. The degree of angularity may be varied without departing from the invention. Each individual cup is mounted together with an opposed cup on a support member comprising a sleeve 87 keyed on a rod 88 rockably mounted at its ends in an upstanding portion 89 of reciprocal carriage members 90, each having an apertured boss slidable on a rod 91 which has its ends supported in bosses 92 projecting from vertical portions of the section 73 of the machine frame. The two carriage members 90 operate together and may therefore be considered as a unitary carriage. For the purpose of obtaining greater rigidity between the carriage members a bar 92 may be employed to connect their lower end portions 93. A pin 94 projecting from one of the lower portions 93 is connected by a link 95 to a rocker arm 96 fixed at its lower end on a rock shaft 97. Movement of the rocker arm serves to effect reciprocation of the carriage members 90. The driving means for the rocker arm 96 will presently be described.

Means are provided for automatically oscillating the vacuum cup support in time with the reciprocation of the carriage upon which the vacuum cups are mounted. For this purpose a rocker arm 100 (see FIGS. 7, 8 and 9) is keyed on the rod 88 and carries at one of its ends a cam roller 101. This roller is constantly urged upward by a coil spring 102 having one end secured on frame section 73 and the other end secured around the pin on which the roller 101 is journalled. The roller is arranged to travel on the under surface of a fixed cam plate 103 having a notch 104 at its mid point permitting the roller 101 to enter, thus bringing the rocker arm to vertical position. On each side of the notch 104 are horizontal surfaces 105, 105 on which the roller 101 may travel to hold one or the other of the groups of vacuum cups horizontal so they may engage flat against the leading blank in one or the other of the magazines. See FIG. 8.

Means are provided for controlling the suction on the vacuum cups so that the cups may engage a vertically disposed blank in the appropriate magazine and, on retrogression, remove it therefrom, bringing the blank down to horizontal position over the feeding conveyor and then releasing it for travel on such conveyor. The source of negative pressure for each group of cups may, if desired, be a single vacuum tank but, as shown herein, there are provided two relatively small, constantly operating pumps 107 and 108 driven by a single electric motor 109. The group of cups 85 has vacuum imposed through conduit 110 from pump 107 and the group 86 has vacuum imposed through conduit 111 from pump 108. A vacuum release chamber 112 is arranged in the conduit 110 and an identical chamber 113 is arranged in the conduit 111. See FIGS. 8 and 9. As indicated in FIG. 9 the bore of the chambers is relatively large compared with the bore of the conduits. A closure valve is provided for each chamber to open it to the atmosphere. These valves are indicated at 114 and 115. The valves are designed to remain closed except for a period when its vacuum cup is directed down, as shown in FIG. 8, to release the engaged blank.

The operating mechanism for the two valves comprise respectively pivotal arms 116 and 116a supported on pivot pins held in respective bracket members, 117 and 117a, keyed respectively near opposite ends of the rod 88. Coil springs 118, 118a connected at one end on an extended part of the bracket and at its other end connected to the pivotal arm, serve to urge the valves toward closed position. The opposite end of each pivotal arm carries a cam roller 119, 119a. Each roller is arranged to engage on the underside of a cam member, 120, 120a, fixed on the frame members on opposite sides of the frame. By comparison of FIGS. 7, 8 and 9, it may be seen that, when the vacuum cup group 85 has engaged a blank and is in the process of pulling it down, the release valve remains closed. However, as soon as the carriage 90 has moved to the right, as shown in FIG. 8, sufficiently to bring the cam roller 101 out from the notch portion 104 of the cam plate 103 to cause oscillation of rod 88 counterclockwise, the rocker arm 100 carried by the rod 88 will be tilted sufficiently to bring the roller on pivotal arm 116 up against the surface of fixed cam 120. This depresses the roller end of arm 116 with respect to rocker arm 100 and lifts the valve 114 thus opening the vacuum release chamber to the atmosphere. The inflow of air through the cup 85 is then reduced to a negligible factor and the blank is permitted to fall onto the feeding conveyor 39.

Figure 7:
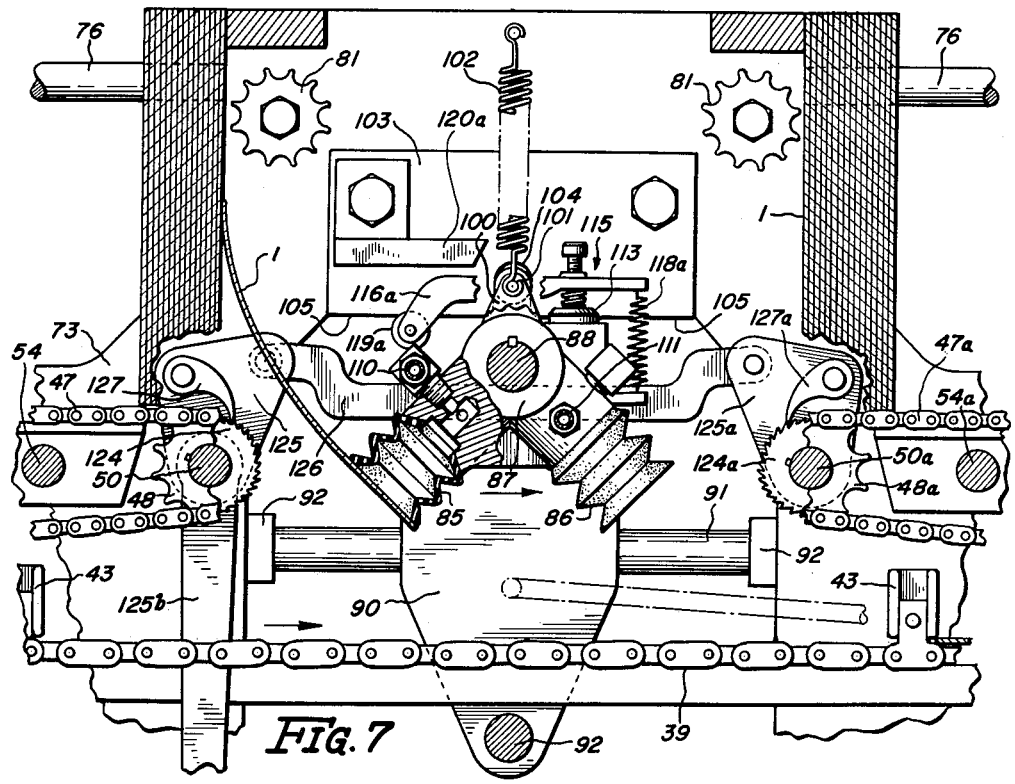
FIG. 7 is a detail side elevational view of the oscillatable suction cup mechanism for removing carton blanks alternately from the two carton blank magazines and delivering them to the feeding conveyor.
Figure 8:
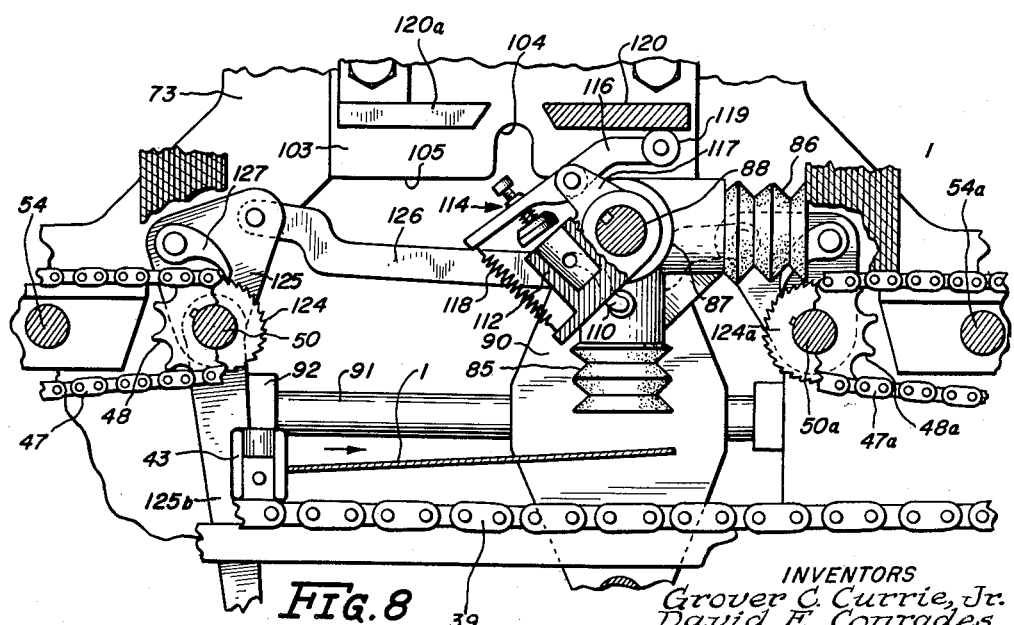
FIG. 8 is a detail view, similar to FIG. 7, but showing the suction cups in a different position.

In the position of the vacuum cup support shown in FIG. 8 the vacuum cup group 86 has been brought over to the right and has engaged the leading flat blank in magazine 31. Since the valve 115 for group 86 is in closed position, the suction through the cups will cause the blank to adhere to the cups. Reverse movement of the support causes the lower portion of the blank to be withdrawn straight out from the magazine until roller 101 again reaches the notch portion 104 of the cam. As the roller passes up into the notch the cup support swings clockwise causing the cup group 86 to move through an arc while moving bodily to the left in a horizontal direction. Just before the cup group 86 reaches a vertical position the valve 115 will be caused to open when roller 119a is brought up against the surface of cam 120a, thus breaking the vacuum in the cup group 86 and releasing the blank onto the feeding conveyor.

Blank Advancing Mechanism

It is desirable to advance the blanks in the magazine a distance equal to the thickness of the blank each time one of the blanks is removed. For this purpose ratchet wheels 124 and 124a are fixed respectively on shafts 50 and 50a which carry the sprockets 48 and 48a for the sprocket chains 47 and 47a which support the blanks in the magazine. Rocker plates 125 and 125a are mounted to rock freely on the respective shafts 50 and 50a and these plates are connected with a pivoted linkage element 126 to operate in synchronism. On each plate is a freely pivoted, gravity operated pawl, indicated respectively at 127 and 127a, with its toothed end meshing with the teeth of the respective ratchets. The pawls are oppositely mounted so that when the rocker plates oscillate on their shafts one pawl will turn its ratchet while the other pawl slips rearward over the teeth of its ratchet. The rocker plate 125 is provided with an elongated arm 125b (see FIGS. 4 and 14) the lower end of which is connected by a link 128 to a rocker arm 129 fixed on shaft 97. By selecting the appropriate ratio between the length of arm 125b and the distance of the pawl pivot from the center of shaft 50 the pawls can be controlled to clear but a single tooth of the ratchet for each oscillation of the plates; and by spacing the teeth of the ratchet a distance equal to the thickness of the blank stock, the magazine chains will advance in steps equal in length to such stock thickness. By reference to FIG. 14 it is apparent that each time the arm 97 is moved to cause reciprocation of the vacuum cup support the arm 125b will also be oscillated to cause actuation of the pawl and ratchet mechanism. Rocker arm 96 is oscillated by a link 130 pivoted to arm 96 at one end and at the other end connected to a crank pin 131 on rotary disk 132 fixed on the end of a jack shaft 133 journalled in the extension 40 of the machine frame.

The jack shaft 133 carries a sprocket 134 fixed thereon having a sprocket chain 135 passing thereover that in turn passes around a sprocket 136 fixed on a shaft 137. This shaft has another sprocket 138 thereon driven by a sprocket chain 139 passing over a sprocket 140 fixed on shaft 41, previously mentioned, which carries sprocket 42 over which passes one of the feeding conveyor chains 39.

The reciprocation of the carriage members 90 is timed with the movement of the feeding conveyor so that blanks will be deposited on the conveyor, preferably, centrally between two adjacent pairs of pusher elements. Thus, in case of any small variation in the release action of the vacuum cups, the blanks neverthless will be deposited between the pushers.

Stripper for Deflecting Separator Tabs

As the blanks are advanced on the feeding conveyor they move past a stripping wheel 142 mounted on the shaft 137. This wheel has three spaced pins 144 projecting radially on its periphery. The spacing is such that each pin will engage beneath one of the separator tabs 25 and fold it upward to a substantial angle from the plane of the blank. See particularly FIG. 13. The driving mechanism for the shaft 137 and the size of the wheel 142 is such that the wheel is rotated at the same peripheral speed as the speed of travel of the feeding conveyor and the wheel is so timed with the conveyor that when the trailing edge of a blank is in contact with the pusher elements 43, 43, the blank will pass over the wheel in correct relation to the pins 144 so that such pins will properly engage and deflect the tabs 25.

In order to hold the blank firmly from upward displacement while the tabs 25 are being folded upwardly and also for the purpose of assuring that the blanks will have their trailing edges in contact with the pushers, there are provided two spaced hold-down shoes 145, 145 (see FIGS. 12 and 13) under which the blanks pass to hold them in close relation to the surface of the wheel 142. These shoes are supported on the lower ends of a U-shaped bracket 146 which in turn is supported on a frame extension 147. See FIG. 4.

The tabs 25, when displaced as illustrated, will be in position to space apart the cans in the adjacent rows when such cans are assembled on the central panel 2 of the blank.

After the tabs 25 are folded up by the stripper 142 they are ready to be delivered to the loading conveyor. In the present instance a blank transfer mechanism is employed to deliver blanks from the feeding conveyor to the loading conveyor. As this mechanism includes parts of the loading conveyor the essentials of the loading conveyor will first be described.

The Loading Conveyor

A suitable base frame is provided with longitudinal members 150 and transverse members 151 supported on legs 152. See FIGS. 5 and 6. This base frame is aligned with the frame of the feeding conveyor and placed in close endwise relation, as indicated in FIG. 5. As here in shown, the loading conveyor comprises three spaced sprocket chains 153, 154, 154 passing respectively around sprockets 155, 156, 156 keyed on a shaft 157 at the receiving end of the conveyor and passing respectively around sprockets 158, 159, 159 keyed on a shaft 160 at the discharge end. The shafts 157 and 160 are suitably journalled in bearings on the base frame. The loading conveyor is driven by a motor 161 connected through suitable reduction gearing to a shaft 162 bearing a sprocket 163 having a sprocket chain 164 passing therearound and around a sprocket 165 on shaft 160. The shaft 157 has sprockets 168 and 168a keyed thereon over which pass sprocket chains 169 and 169a which also pass around sprockets 169c and 169d respectively, keyed on shafts 41 and 41a. This constitutes the driving means for the feeding conveyor. The ratio of the gearing is such that the feeding conveyor will travel at a speed sufficiently faster than the loading conveyor so that the pusher elements 43 will deliver blanks to the discharge end of the feeding conveyor in exact time with the travel of blanks on the loading conveyor.

The links of the loading conveyor chains 153, 153 have short plates or slats 153a secured thereto approximately as long as the dimension of the central panel of the carton. These plates thus support the central panel of the blanks and continue to support such panel after the cans are delivered thereon and while the packages are formed. The loading conveyor chains 154, 154 have small lugs or pusher elements 166 thereon which may bear against the trailing edge of the blanks to keep them in proper alignment as they are advanced. On the center chain in the present instance every fourth plate 153a has secured thereto a lug 167. These lugs function as spacers for the groups of cans delivered to the central panels of the blanks and serve to support the leading and trailing faces of the packages when formed. The lugs 167 have a height which requires shafts 41 and 41a, driving the feeding conveyor chains, to be separated endwise as shown in FIG. 14 to permit the ends of the lugs to swing through this space. See also FIG. 5.

Transfer of Blanks to Loading Conveyor

The action of the blank transfer mechanism is to engage the blanks as they reach the end of the feeding conveyor and move each one with a relatively rapid motion into place against the trailing face of a lug on the loading conveyor before the next oncoming lug can move through the path of travel of the blank. To obtain this result two narrow squeeze rolls 170, 170 are mounted on shaft 157 in spaced relation and freely movable on such shaft. Two smaller squeeze rolls 171, 171 are disposed in vertical alignment above the respective rolls 170. The weight of each roll 171 is supported on the companion roll 170 by pivotally mounting each roll between the jaws of a yoke member 172 having its rear end pivoted on an upstanding portion 173 on the frame member 150. The lower squeeze rolls 170, 170 each has a sprocket 174 secured thereto so that these rolls may be driven independently of the shaft 157 which supports them. Sprocket chains 175, 175a pass respectively over these sprockets and over sprockets 176, 176a, respectively, keyed on the respective short shafts 41 and 41a. See FIGS. 14 and 21.

The ratio of the sprocket sizes is such that the squeeze rolls will travel at a lineal speed in excess of that of the feeding conveyor. Thus, as shown in FIG. 5 an advancing blank will move from the end of the feeding conveyor and as soon as its leading edge reaches the nip between the upper and lower squeeze rolls, the blank moves forward with an accelerated motion causing the advancing edge of the blank to abut the rear faces of the lugs 166, 166 and 167. The surfaces of the squeeze rolls are preferably formed of a relatively smooth metal so that the rolls will not cause buckling of the blanks but will permit relative slippage between the paperboard blank and the roll surfaces, thus urging the blanks against the lugs with a relatively gentle force until the lugs have advanced far enough that the trailing edge of the blank passes out from the nips of the two sets of rolls. In a short interval of time after the blank has cleared the rolls the next oncoming lugs will move up around the sprockets 155 and 156 and will come into propelling contact with the trailing edge of the blank.

In order to support the blanks during their transfer from the feeding conveyor to the loading conveyor bridging elements 177, 177 are provided (see FIGS. 5 and 15) which may be secured to the frame extension 40 and extend to a point adjacent the nips of the two sets of squeeze rolls 170 and 171.

Additional hold-down shoes, one of which is shown at 178 in FIG. 5, may be provided to hold the blanks flat against the conveyor chains 153 and 154 as they are being advanced by the squeeze rolls. These hold-down shoes are supported on the lower ends of a yoke shaped bracket member 179 secured to the upstanding member 173 by a horizontal frame element 180.

Delivery of Cans Onto the Carton Blanks

After the blanks have been received onto the loading conveyor and have reached the point where the lugs 166 and 167 are positioned at both the leading and trailing edges of the blanks they are ready to receive a load of cans onto the center panel of the blank. In the present instance the cans are delivered onto the blank in two rows of three cans each, the rows being disposed lengthwise of the conveyor travel.

As shown in FIGS. 1, 20 and 21, the cans are first conveyed in single file parallel to the feeding and loading conveyors on endless slat conveyors 184, 184. These conveyors may conveniently be driven from a motor 185. Each conveyor belt 184 passes around a roller at its delivery end mounted on short, aligned shafts 186, 186 journaled on the frame. These shafts each carry sprockets 187, 187 thereon and are driven from sprockets 188, 188 by chains 189, 189. The sprockets 188 are keyed on a shaft 190 journalled on the frame and disposed below the loading conveyor. Shaft 190 carries a sprocket 191 driven by chain 192 passing around sprocket 193 secured to a shaft 194 driven by reduction gears in gear box 195 connected with the shaft of motor 185.

The cans on the conveyors 184 (see FIGS. 15, 20, and 21) are shunted off such conveyors between side guide members 196, 196 and lower plate supports, as shown at 197, which are on a level just above the flat blanks on the loading conveyor. The side and lower guide members are arranged diagonally with respect to the loading conveyor. The cans are propelled along each of the sets of guides by screw conveyors 198, 198. See FIG. 21. The discharge ends of the screw conveyors are reduced and each is received into a journal in the lower end of a depending bracket as indicated at 199, 199. The opposite ends of each screw conveyor are also reduced and received within respective bearings 200, 200 which are formed as parts of gear housings 201, 201. A bevel gear, one of which is shown at 202 is secured on each of the reduced ends of the screw conveyors and the bevel gear 202 meshes with a similar bevel gear 203 on a short shaft 204 journalled in the gear housing. Each shaft 204 carries a sprocket 205 around which passes a sprocket chain 206 which in turn passes around sprocket 207 secured on shaft 208 journalled on the frame 150. The two shafts 208, 208 are in alignment and have their inner ends spaced from each other.

Each shaft 208 carries a sprocket 209 around which passes a chain 210 which in turn passes around sprocket 211. The two sprockets 211 are secured respectively at the outer ends of shaft 157 which is driven by the conveyor chains 153 and 154. The ratio of the gearing is such that the screw conveyors travel at a speed slightly greater than the speed of the loading conveyor and provision is made for a slight slippage in the drive of the screw conveyors by employing a friction coupling between the bevel gears 202 and the reduced end portions of the screw conveyors. The purpose of this drive will presently be made clear.

The lugs 167, as shown in FIG. 20, are generally U-shaped and comprise two upstanding portions 214, 214 having upper and lower, outwardly extending can separator portions 215, 215a of triangular shape. The front edges of these portions extend at right angles to the travel of the conveyor and the rear faces are inclined at an acute angle to the direction of conveyor travel. The can guide bars as shown in FIG. 15 converge inward and terminate at a point just short of the path of travel of the outstanding separator portions. The movement of the screw conveyors causes cans to be continuously brought into position on the central panels of the blanks. As the lugs advance between the ends of guides 196 cans are yieldingly urged against the trailing faces of the lugs. As the third can in each line of cans approaches its position on the panel, the next oncoming lug will move into position so it will be between the third can of each line and the next succeeding can in such line. The next succeeding cans will engage the inclined surfaces of the portions 215 and 215a which will momentarily slow up the movement of all the cans in the line following the three in each line which have been segregated between the leading and trailing lugs. This process will then continue indefinitely while cans are being supplied to the loading mechanism.

As soon as the two groups of three cans each have passed the end of the screw conveyor they will appear as shown at the right in FIG. 15. The cans will be in place on the central panel of the carton blank and the two rows will be held from the front and rear by lugs 167. As herein illustrated, the two rows of cans as soon as they clear the screw conveyor are held in position by a centrally located vertically disposed blade 217 (see FIGS. 5, 15 and 20) and by side guide members 218, 218. The blade and side guides are suspended from a vertically adjustable frame member 219 the details of which will be described below. The lower edge of the blade 217 is disposed sufficiently above the blank so that it will move freely above the upturned tabs 25, 25. These tabs upon entering between two rows of cans are raised substantially to vertical position by the cans moving in on the side to which they are inclined. It is thus necessary only to deflect these tabs through a moderate angle, preferably over 45°, and the cans coming into contact with the tabs will complete their movement to vertical position.

*Stripping the Lock Tabs and Folding Narrow End Panels*

During the time a group of cans is being brought into position upon the central panel of the carton blank it is desirable to begin the conditioning of the end portions of the blank to prepare them for subsequent locking. As a first step the T-shaped locking tabs are stripped or deflected out of the plane of the blank so that they may be held clear while the narrow marginal panel in which they are formed is folded. Referring to FIGS. 3, 15, 19, 20 and 21, there is shown a stripper wheel 223 fixed on the end of a short shaft 224 journalled in a bearing in an upstanding frame element 225 on the frame member 150. On the opposite end of the shaft 224 is keyed a spur gear 226 meshing with a similar gear 227 on a shaft 228 journalled on the frame. On the opposite end of shaft 228 is keyed a sprocket 229 (see FIG. 21) over which passes a sprocket chain 230 passing around a similar sprocket 231 keyed on the shaft 208 which is driven from one of the main shafts for the loading conveyor. Thus the stripper wheel is rotated at a lineal speed equal to that of the loading conveyor and the surface of the wheel adjacent the loading conveyor moves in the same direction as the conveyor. The stripper wheel is provided with two radially extending pins 233, 233 which, as they rotate, progressively engage and depress the T-shaped locking tabs 18, 18. The tabs are thus deflected from the plane of the blank which permits the marginal folding means to fold the marginal panels without also engaging the locking tabs.

As soon as the locking tabs are depressed they continue to be carried forward with the blank and pass under a folding plow element 236, and at the same time the narrow marginal panel 7 of the blank passes over the element 236. See FIGS. 16 and 20. The edge portion of panel 5 which is adjacent to the panel 7 passes under a hold-down shoe 237, held above but closely adjacent to the blank by frame clips 238, 238a. As shown in FIGS. 16, 17, 18 and 20, the plow element 236 at its receiving end is horizontal and, at its opposite end, it has been brought over to assume an acute angle with respect to the hold-down shoe 237.

At the opposite end of the blank the edge panel 8 is preferably folded upwardly simultaneously with the folding of the marginal panel 7 just described. For this purpose a hold-down element 243, similar to element 237, is supported above the path of the blank so that the outer edge portion of panel 6 may move thereunder, and a plow element 244, similar to plow 236, is secured so that one end is substantially horizontal and its opposite end is disposed over and at an acute angle with respect to the hold-down element. The hold-down element is supported on clips 245 and 245a secured to the machine frame.

It is to be noted that, in the folding of marginal flaps 6 and 7, the rigid tabs 16 and 17 along the fold lines of the flaps will not be affected and are allowed to continue to extend in the planes of their attached panels.

For the purpose of supporting the blanks between the center conveyor member 153 and outside conveyor chains 154, 154 there are provided supporting plates 246, 246 (see FIG. 20) secured to the frame and disposed with their upper surfaces coplanar with the conveyor plates 153a.

The blanks, after passing the folding plows 236 and 244, as shown in FIGS. 15 and 20, will be carrying a group of two rows of three cans each, located on the central panel 2, with the adjacent cans in the two rows disposed on each side of the upwardly folded tabs 25 and the two rows of cans also being guided and separated by the blade 217. The marginal panels 7 and 8, upon leaving the plow assemblies will remain at an angle to their attached panel due to the folding of such panels over to assume a relatively small angle with respect to such panels. By thus folding well beyond a 90° angle, the panels 7 and 8 will tend to return only part way to their original position. In practice, these panels after folding will usually remain at an angle of approximately 60° to 90° to their attached panels, depending upon the stiffness of the paperboard. See FIGS. 3 and 12.

*Folding the Side and Top Panels*

Referring to FIGS. 6 and 22, it may be noted that, as soon as the narrow panels 7 and 8 are folded, the side panels 3 and 4 will reach plow rods 248, 248 which cause the panels 3 and 4 and their respective attached panels 5 and 6 to swing toward a vertical position. The lower end of each plow rod 248 has a threaded portion received in an arcuate notch 249 formed in each frame member 150. By means of a wing nut 250, threaded onto the threaded end of each plow rod, it may be held firmly. The opposite end of each plow rod has a vertical portion 251 pivotally held in frame member 150. Thus, by swinging the lower ends of the plow rods laterally as permitted by the arcuate slots, the rods may be adjusted to slightly different angular positions and secured in such positions by the wing-nuts.

For the purpose of holding the cans firmly upon the central panel 2, hold down rods 252, 252 are provided which are swingably supported on the frame member 219 on pivoted rods 252a having their ends supported in bearing brackets secured to such frame member. See FIGS. 6, 22 and 24.

As soon as the leading edges of the panels 3 and 4 with their respective attached panels 5 and 6 have passed a short distance beyond the plow rods 248 they reach folders indicated as a whole at 253 and 253a. Depending on the resiliency of the paperboard from which the blank is formed, the particular positioning of the plow rods 248, and the manner in which the crease lines have been impressed between the panels, the half-width panels 5 and 6 may be folded partially so that they will be disposed at a greater or less angle with respect to the planes of their attached side panels. The particular angular relationship of these half-width panels to their attached panels as they leave the plow rods 248, 248 is not material to the present invention.

Upon clearing the ends of the plow rods 248, 248 the side panels 3 and 4 will each have been brought to flat position against the respective sides of the group of cans, as best shown in FIG. 3. The panels 5 and 6 may extend vertically or somewhat inclined over the group of cans. Means are provided for positively retaining the side panels 3 and 4 in close contact with the sides of the cans. For this purpose side pressure members in the form of endless chains 254, 254 are disposed one on each side of the can groups. As best shown in FIGS. 6, 21 and 22 each chain 254 is supported on two spaced, horizontally positioned sprockets 255 and 256. These sprockets are fixed on respective vertical shafts 257 and 258. The shafts 257 are each journalled to rotate freely in lower bearings 259 supported on frame member 150. The shafts 258 are each journalled at their lower ends in bearings 260 on frame member 150. At their upper ends the shafts 258 each have a bevel gear 261 secured thereon, meshing respectively with similar bevel gears 262, 262 on a horizontal shaft 263. The drive for this shaft is through a sprocket 264 fixed on the shaft over which a sprocket chain 265 passes which also passes around a sprocket 266 on shaft 160 which, as previously explained, is driven directly through sprocket chain 164 from motor 161.

The chains 254 each have affixed thereon a plurality of spaced, vertically disposed, narrow plates 254a which bear directly against the side panels to hold them snugly against the cans while the half-width panels are being folded in and secured together.

*Folding the Top Panels*

The folders 253 and 253a for the half-width top panels are shown in FIGS. 6 and 22 in combination and shown in FIGS. 23 and 25 more in detail. The folders comprise upper initial folding sections of inverted V-shape in cross section which have their ends spaced somewhat outwardly of frame member 219. The folders are inclined inwardly toward the frame 219 and downwardly and terminate in flat sections disposed in horizontal relation close to the tops of the cans and bearing flatwise upon the half-width panels after they have reached final position. As herein shown, the folders 253, 253a comprise bent, metal strips 267, 267a which at their upper end portions may assume an angle of approximately 45° to the vertical and at their lower end portions assume a flat position to urge the half-width panels to their final position against the top ends of the group of cans. The initial V-shaped sections are preferably provided by welding short V-shaped angle elements 268 and 268a to the respective strips 267, 267a. See FIGS. 23 and 25(b). These channel elements each in turn have a small bracket 269, 269a welded to it at one end and secured at its other end to frame 219. Similar, but longer brackets 270, 270a, secure the mid-portion of strip 267 to the frame 219. Near the lower end of each strip is secured an additional element which may be a modified section of angle iron, one web of which, indicated at 271, 271a, is shaped so that its edge will follow the contour of the strip and the other web, partially cut away, indicated at 272, 272a, is welded to the back of the strip. Thus, the webs 271, 271a, extending downward, form with the respective strips 267, 267a, additional V-shaped folding sections. The V-shaped section 272 is preferably formed somewhat deeper toward its closed edge, as indicated in FIG. 25(c), to accommodate the T-shaped locking tabs so that these tabs may remain intact and allowed to project approximately in the plane of their attached wall panels 5.

As the cans and carton continue to move toward the ends of the folders 253 the marginal flaps 7 and 8 will meet centrally of the can rows and will be inserted simultaneously between such rows and the panels 5 and 6 will be brought down to rest flat upon the tops of the can rows. See FIGS. 3 and 25(d).

The blade 217 supported from the frame member 219 is preferably extended to the folder section 253 to assist in the introduction of the narrow panels 5 and 6 between the rows of cans. As shown in FIG. 6, the blade 217 is partly cut away adjacent the can hold-down rods 252 so that it remains clear of the top surfaces of the cans. This permits the can rows to come together into close contact at their upper ends while the side panels are being folded upward around the can group. As shown in FIG. 23 the blade 217 is shaped on a downward curve just ahead of the folder section 253. The upper edge of the blade is also cut away so that the blade terminates in a straight, narrow section 217a projecting horizontally with its upper edge located somewhat below the level of the can chimes as shown in FIGS. 25(c) and 25(d). As the adjacent rows of cans move from the position shown in FIG. 25(a) to that shown in FIG. 25(b) the can rows first become separated by the blade section 217a. The can rows are next spread even further apart by spreading elements 274, 274 which are in the form of relatively thin, flat strips secured to the horizontal section of the blade 217a. As the can group continues to advance toward the end of the folder 253 the narrow panels 7 and 8 are progressively moved lower by contact of the plow strips 267 and 267a with the panels 5 and 6 until these panels are brought flat against the tops of the can as seen in FIG. 25(d) and the narrow panels 7 and 8 are fully inserted into the space between the rows of cans. Further travel of the package as thus far formed will carry the cans past the end of the blade and spreaders thereon, allowing the can rows again to come into close contact, due to the resilience of the paperboard which tends to oppose the spreading action.

*Insertion of Lock Tabs*

When the two half-width panels 5 and 6 have been brought down on the tops of the cans, as shown in FIG. 25(d), the T-shaped locking tabs are in a position overlying the individual tabs 21 which are cut to provide locking openings 22 within the panel 6. Also in this position of the half-width panels, the small rigid tabs 17, 17 will have been received into the openings formed by cutting the similar rigid tabs 16, 16 from the narrow panel 7. As so assembled, the carton is now ready to have its ends secured together by the insertion of the T-shaped locking tabs into the openings 22. Means are provided, timed with the movement of the packages, to cause insertion of the locking tabs into the locking openings. In the present construction this means comprises a wheel 275 having a plurality of pairs of controlled locking fingers 276, 276 supported in radial positions on the wheel 275. See FIGS. 3, 22 and 26 to 31 inclusive. As the packages pass below the wheel 275 the locking fingers 276 are progressively brought into registry with the tabs while the fingers are held in a retracted position. Then as the wheel brings each individual locking finger close to vertical position over the locking tab, the finger is caused to move radially downward to depress the locking tab and force it against tab 21, swinging such tab downward and carrying the locking tab through the opening 22. The wing portions of the locking tab, after clearing the opening, snap in behind the margins of the opening. The plain tab 21, being relieved from the pressure forcing it downward, will also swing back toward its original position and will tend to lie relatively flat against the under surface of the T-shaped tab.

It is to be noted that the locations of the openings 22 register with the spaces left at the ends of the can group where four cans are arranged in contact in a rectangular grouping. The T-shaped tabs thus may move inward freely without interference from the cans.

The wheel 275 is mounted on a shaft 278 journalled in a swingable or tiltable frame 279 comprising a pair of arms which carry journals 280 at one end, surrounding the shaft 263. A spur gear 281, keyed on the shaft 263, meshes with another spur gear 282, keyed on shaft 278. By means of this drive the wheel 275 will be rotated so that its peripheral speed equals the lineal speed of the loading conveyor and the adjacent portions of the conveyor and wheel will travel in the same direction.

The end of the frame 279 opposite the shaft 263 comprises a rod 283 free to turn within openings in the arms of the frame. This rod has a centrally located, radially extending, threaded opening into which is threaded an adjusting screw 284 rotatably supported in a bearing 285 which in turn is rockably supported on an upstanding portion 286 of the machine frame. Fixed collars 287 and 287a on the screw, above and below the bearing 285, hold the screw from endwise movement. A crank wheel 288 is secured to the upper end of the screw 284 by means of which the screw may be rotated manually to adjust the height of the wheel 275 above the loading conveyor.

For the purpose of causing the tab locking fingers 276 to extend and retract, each finger is formed on a base portion 290 channelled on two sides so that such base portion may be slidably received within a radial slot 291 formed in the wheel 275. A cam plate 292 has a center bearing fitted on the shaft 278 which permits the cam to be placed in various angular positions. A cam groove or raceway 293 is formed in the face of the cam plate on the side adjacent the wheel 275. Within this groove is received a roller 294 freely turnable upon a spindle having a threaded end 295 which may be secured within a threaded aperture in the base portion 290 of the locking finger. As shown in FIG. 27 the cam groove is concentric with the shaft 278 for the major portion of its extent. At one point the groove has a rather abrupt outward curve as shown in FIG. 27. With the rollers 294 on the locking fingers travelling in the concentric portion of the groove the fingers will remain retracted. However, when the roller passes through the outwardly curved portion, the finger will be extended and then retracted in rather quick succession. By locating the cam 292 so that the outwardly curved portion of the groove extends vertically below the shaft 278 the fingers may be extended and retracted during the time they pass through their vertical positions. FIGS. 29 and 30 show the progressive action of the locking fingers and FIG. 31 shows the positions of the T-shaped locking tab and the underlying tab 21.

In order to hold the cam plate 292 stationary a link element 297 is pivotally secured at one end on a pin 298 extending from the rear face of the cam near its upper edge as shown in FIG. 6. The other end of the link is pivotally secured to a pin in an upstanding part 299 of the machine frame. A turnbuckle 300 may be employed in the link for the purpose of making slight adjustments in its length.

The wheel 275 preferably has three pairs of locking fingers. By this construction the wheel makes one revolution during the passage of three packages. Arranging a plurality of pairs of fingers on this wheel permits the use of a larger radius thus causing the fingers to move more nearly in a vertical direction while being extended and retracted.

The frame member 219 which carries the blade 217, the side guides 218, the can hold-down rods 252 and the half-width panel folders is preferably mounted on the base frame for quick up and down adjustment so that the mechanism can readily be conditioned to form packages of cans of varying height. As best illustrated in FIGS. 6 and 20 the frame member 219 terminates at its ends in apertured bosses 303 and 303a. The apertures in the bosses are threaded to receive vertically disposed, similarly threaded screws 304 and 304a. The screw 304 is rotatable within a journal opening in the horizontal portion of an upstanding frame member 306 and is prevented from shifting vertically by collars 307 and 307a fixed on the screw above and below the horizontal frame member. The screw 304a in a similar manner is mounted in a journal opening in a bracket 308 secured to the frame member 286. Upper and lower collars 309 and 309a on the screw 304a retain it from vertically shifting in the bracket. Each screw 304 and 304a has a sprocket keyed thereon over which passes a sprocket chain 310. A crank wheel 311 keyed on screw 304 may thus rotate both screws 304 and 304a simultaneously to raise or lower frame 219 evenly to adjust its height to the height of the cans being packaged.

The adjusting screw 284 for the frame 279 which carries the wheel for the tab locking fingers is preferably connected to the screw 304a by sprockets keyed on the screw 304a and the screw 284 with a chain 314 passing over such sprockets. Thus, by turning either the crank wheel 288 or 311 the frame member and attached parts can be adjusted vertically and at the same time the wheel 275 with the tab locking fingers can be similarly adjusted. The adjustment of the mechanism to accommodate cans of varying height is thus quickly and simply handled.

The side guides 218 are supported on threaded rods 312 secured within openings in the frame member 219. Upstanding bracket elements 313 have their lower ends secured to the guides 218 and at their upper ends are supported near the ends of the rods 312. By holding the upper ends of these rods with lock nuts the rods may be fixed in the proper lateral positions with respect to the sides of the can groups.

After the locking tabs have been tucked into the locking openings by the fingers on wheel 275 the packages are complete and are ready to be discharged from the loading conveyor. As shown in FIG. 6, a take-off conveyor 315 is arranged at the end of the loading conveyor. This take-off conveyor may be of any convenient or desired construction. As shown, a plurality of rollers 316 may be arranged to receive the packages. The rollers immediately adjacent the end of the loading conveyor are preferably narrow and secured on closely spaced bars so that the spaced members of the lugs 167 may pass on the opposite sides of the rollers. The pressure of the bars 254a on the packages continues until the packages pass the shafts 258, 258 supporting the chains of the pressure section and, before this side pressure is fully released, the leading edge of the package reaches the first roller 316, and the package will then move onto the conveyor 315.

*Summary of Operation*

In the operation of the machine the adjustable frame member 219 will be positioned properly for the height of cans to be packaged and the side guides 218 will be fixed in the proper positions to engage laterally against the can groups. The motors for the conveyors and vacuum pumps will be started and a supply of carton blanks will be delivered to each of the carton magazines with their printed surfaces directed rearwardly of the magazines. Filled cans will be brought to the machine on the two side conveyors 184, 184. The vacuum cup blank delivery mechanism will begin its operation simultaneously with the starting up of the feeding and loading conveyors and, by means of such vacuum cup mechanism, blanks will be removed alternately from the two blank magazines and deposited on the chains 39, 39 of the feeding conveyor with their printed surfaces down. The blanks will be propelled toward the loading conveyor by the pusher elements 43.

The blanks are next operated upon by the stripping wheel 142, the fingers of which deflect upwardly the small tabs 25 disposed along the center line of the central panel 2 of the blank. The blanks are then transferred to the loading conveyor chains 153, 154, 154 by the transfer mechanism comprising lower pinch rolls 170, 170 and upper pinch rolls 171, 171 which accelerate the movement of the blanks and force their leading edges against the rear faces of lugs 167 on the loading conveyor just prior to the movement of the next oncoming lug into position against the trailing edge of the blank. With the blanks thus held on both edges by the lugs 167 and the small lugs 166 on the side conveyor chains 154, they are ready to have a load of cans delivered onto their central panel 2.

The cans are urged forward toward the blank on the loading conveyor by screw conveyors 198. A group of three cans each is arranged on each side of the center line of the panel 2. The leading can of each group bears against the rear of one of the upright portions of a forward lug 167. Such leading cans also bear laterally against the blade 217. The two following cans of each group bear against the can ahead and against the blade. All three cans of each group are also restrained from outward movement by the side guides 218. As the third can of each group moves into position the laterally extending, triangular portions 215, 215a of the next lug moves in behind such third can and thereby serve to hold the cans in each row in firm contact with each other. At the same time the lugs are segregating three cans from the line of cans brought in by the screw conveyor the rear faces of the lugs will momentarily hold back the advancing line of cans. The action is then repeated indefinitely as additional lugs move into position. See FIG. 15.

The next operation is to deflect the T-shaped locking tabs from the plane of the marginal panel 7 and to fold both panels 7 and 8 upward whereby their scores will be broken or prefolded and during subsequent treatment of the blank these panels 7 and 8 will remain folded substantially away from the planes of their attached panels 5 and 6. The deflection of the T-shaped tabs is performed by the stripper wheel 223 with radially extending teeth 233, and folding of the marginal panels is performed by the folders 236 and 244. See FIG. 20.

The next operation is performed by the folder plows 248. See FIGS. 6 and 22. These plows bring the side panels 3 and 4 up against the sides of the can group. The partly formed package then moves into the lateral pressure section to hold the side panels firmly against the cans, and the half-width panels carrying the prefolded marginal panels 7 and 8 are engaged by the folders 253 and 253a (see also FIG. 23) to bring the half-width panels entirely down against the can tops and tuck the narrow marginal panels 7 and 8 between the two rows of cans. Just prior to the insertion of these panels between the rows, such rows are somewhat spread apart by reason of the passage of the cans past spreader elements attached to the forward portion 217a of the blade 217.

The final operation is to tuck in the T-shaped locking flaps within the openings 22 by the wheel 275 and the package is complete. The thus completed packages are delivered to a roller conveyor as indicated or may pass down a chute or be removed by hand as desired. As previously mentioned, the blanks are preferably printed in such manner that the half-width panels are the bottom of the package and the central panel 2 is the top.

It should be noted that while the operation of the subject apparatus has been described in relation to a specific carton construction and blank, the use of the apparatus is not confined to the setting up of this blank alone. Various styles of cartons are susceptible to use with this apparatus and it is not intended that the appended claims be limited by the carton illustrated in the drawings.

While the foregoing specification sets forth the invention in specific terms, it is to be understood that many variations and modifications may be resorted to without departing from the broad aspects of the invention as defined by the following claims.

Having now described the invention, what is claimed is:

1. In a machine for loading cans within wrap-around type cartons which include a wall panel carrying a narrow, marginal, hinged, end panel in which spaced locking tabs have been cut with hinge lines registering with the hinge between the wall panel and the marginal panel, a conveyor for advancing the blanks in flat condition, means for stripping the locking tabs from their positions within the marginal tabs comprising a shaft supported above the conveyor and extending at right angles to its direction of movement, a stripping wheel on the shaft, radially extending stripping fingers carried on said wheel, the individual fingers being adapted progressively to engage the individual locking tabs and depress them as the wheel is rotated, means for driving the conveyor and stripping wheel in timed relation, and plow means adjacent the stripping wheel arranged to engage and fold the narrow marginal panel toward the stripping wheel as the carton blank is advanced, said radial fingers being arranged to press downward on the locking tabs after the panel has been partially deflected from the plane of the blank.

2. In a machine for loading cans within wrap-around type cartons, a loading conveyor adapted to convey blanks in flat position to receive a group of cans thereon, a vertically disposed blade supported closely above the conveyor and aligned with its direction of travel, a side guide element supported closely above the conveyor parallel with the blade and spaced therefrom a distance conforming to the diameter of cans to be loaded on the carton blank, spaced lugs on the loading conveyor each having portions extending laterally into the space between the blade and side guide element to retain cans positioned between the blade and side guide, said lugs also being adapted to engage the trailing edge of a carton blank to advance the blank while receiving a load of cans, the spacing between successive lugs on the loading conveyor being uniform to hold a predetermined number of cans in a row between said lugs, means for conveying cans in a continuous, unbroken line to a position between the blade and side guide and onto a flat carton blank, said means comprising a guide rail and a screw conveyor spaced therefrom and having a thread conforming to the can diameter, whereby cans may be propelled between the guide rail and the screw thread by rotation of such screw conveyor, said guide rail and screw conveyor being disposed at an acute angle to the blade and side guide and terminating outside the path of the laterally projecting portions of the conveyor lugs, whereby when a predetermined number of cans has been delivered to the carton blank behind an advancing lug, the projecting portion on the next succeeding lug will move between the final can in the group and the next oncoming can, and driving means for the screw conveyor adapted to deliver cans normally at a rate conforming to the travel of the loading conveyor, said driving means including a slippage connection to allow travel of cans on the screw conveyor to be retarded for brief intervals during interposition of the projecting portions of the lugs between the cans.

3. In a tab locking mechanism for wrap-around type cartons having a bottom and two side walls, each of the side walls carrying a sectional wall panel which form a composite closure wall, one of the sectional panels having a locking tab on its outer edge and the other sectional panel having formed within its edge portion a locking opening to receive the locking tab by a tucking operation in which the locking tab is brought into a flat position over the opening and thrust flatwise through the opening, the combination of a conveyor for advancing such cartons after loading, with the sectional panels in closed position and with the locking tab of one wall section positioned flat over the locking opening in the other wall section, a shaft supported over the conveyor at right angles to its direction of travel, a tab locking wheel on said shaft, a tab depressing finger mounted on the wheel for in-and-out radial movement, means for rotating the wheel, means for holding the tab locking finger in retracted position during a major portion of the rotation of the wheel, the rotation of the wheel being timed with the travel of the conveyor, whereby the locking finger will be brought into approximate registry with the locking tab as the finger passes through vertical position adjacent the carton during rotation of the wheel, and means for causing outward radial movement of the locking finger to depress the locking tab through the locking opening and immediately thereafter to retract the locking finger during the period when the locking finger is approaching, passing through and leaving such vertical position.

4. In a tab locking mechanism for wrap-around type cartons having a bottom and two side walls, each of the side walls carrying a sectional wall panel which form a composite closure wall, one of the sectional panels having a locking tab on its outer edge and the other sectional panel having formed within its edge portion a locking opening to receive the locking tab by a tucking operation in which the locking tab is brought into a flat position over the opening and thrust flatwise through the opening, the combination of a conveyor for advancing such cartons after loading, with the sectional panels in closed position and with the locking tab positioned flat over the locking opening, a shaft supported over the conveyor at right angles to its direction of travel, a tab locking wheel on said shaft, a radially disposed guide means on the wheel, a tab locking finger mounted on the guide means for in-and-out radial movement, a cam plate supported in fixed position adjacent the wheel, a guideway on the cam plate, a cam follower element on the locking finger extending into operative relation with the guideway having a dwell portion concentric with the wheel for its entire extent except for an operative part at its lowermost portion adjacent the closure panels of a carton on the conveyor, such operative part having a substantially symmetrical, outwardly directed, U-shaped form to effect relatively rapid extension and retraction of the tab locking finger as the rotation of the wheel carries the locking finger past the operative part of the cam, means for rotating the wheel in time with the travel of the conveyor, whereby, when the conveyor carries the carton past the wheel, the locking tab on the carton will be in registration with the outer end of the locking finger which is simultaneously passing the operative part of the cam, causing the end of the finger to force the tab through the locking opening.

5. In a tab locking mechanism for folding cartons of the type having locking parts in two meeting walls comprising an opening formed in one wall and a wing-type tab on the other wall which, when forced flatwise through the opening, will become locked therein, the combination of a conveyor for advancing such cartons in readiness to be locked, lugs on the conveyor for retaining the cartons in fixed position thereon, a shaft supported over the conveyor at right angles to the direction of travel of the conveyor, a tab locking wheel on the shaft, a plurality of radially disposed guide means spaced symmetrically on the wheel, a tab locking finger mounted on each guide means for in-and-out radial movement, a cam plate supported in fixed position adjacent the wheel, a guideway on the cam plate, a cam follower element on each locking finger extending into operative relation with the guideway, the guideway having a dwell portion concentric with the wheel for its entire extent except for an operative part at its lowermost portion adjacent the cartons carried by the conveyor, such operative part having a substantially symmetrical, outwardly directed, U-shaped form to effect relatively rapid extension and retraction of the tab locking fingers as the rotation of the wheel carries the locking fingers past the operative part of the cam, the spacing of the fingers on the wheel conforming to the spacing of the lugs on the conveyor, means for rotating the wheel in time with the travel of the conveyor whereby, when the conveyor carries cartons past the wheel, the locking tab on each carton will be brought into registration with the outer end of a locking finger which is simultaneously passing the operative part of the cam, causing the end of the finger to force the tab through the locking opening.

6. In a machine for loading cans within wrap-around cartons of the type which comprises an elongated blank having a central panel for receiving a group of cans in two rows extending transversely of the blank, side panels hinged to the central panel, such side panels each carrying a hinged top closure panel, one of which is formed with a tab receiving opening adjacent its free edge and the other having a locking tab adapted to be engaged within the opening by being pressed flatwise thereinto, the combination of a base frame, a loading conveyor on the base frame for carrying blanks flatwise past a loading station, and thence past stations for folding the side and top panels and securing the locking tabs, conveying means adapted to deliver a group of cans to the central panel of a blank on the loading conveyor, an elongated supplemental frame positioned on the base frame above the loading conveyor, folding means on the base frame for effecting upward folding of the side walls as the blanks are carried past such means, closure panel folding means on the supplemental frame for folding the closure panels downward to closing position, a second supplemental frame positioned on the base frame adjacent the last mentioned folding means and above the loading conveyor, a tab locking wheel journalled on said frame, said wheel having tab engaging fingers thereon, means for driving the loading conveyor and the tab locking wheel in timed relation to bring the fingers into registry with locking tabs on closed cartons carried by the loading conveyor, and common means for adjusting the height of both supplemental frames simultaneously and uniformly to adapt the mechanism for packing cans of varying heights.

7. In a machine for loading cans within wrap-around type carton blanks which include a bottom panel, side panels hinged thereto and a pair of sectional top wall panels hinged to the side panels, the top panels each carrying a narrow, hinged end flap arranged to be brought into contacting relation and tucked in between adjacent rows of cans within the carton and held permanently in such position, a continuously operating conveyor for advancing such carton blanks with the bottom panel held flatwise on the conveyor, means for loading a group of two rows of cylindrical cans in upright position onto the bottom panel, means for folding the end flaps out of the planes of their attached panel sections in position to be tucked between the can rows when the panel sections are brought to a position flat upon the tops of the cans, means for folding the side wall panels into position against the sides of the can group, means for spreading apart the rows of cans, means for folding the sectional top panels down on the tops of the cans in the can group and concurrently inserting the folded end flaps between the can rows.

8. Mechanism, as defined in claim 7, in which the spreading means for the can rows comprises a supporting frame, a plate member depending from such frame disposed symmetrically with the conveyor, whereby rows of cans will move along opposite sides of the plate member, such plate member having a narrow portion extending in the direction of advancing movement of the conveyor with the upper edge of the plate member disposed below the upper portions of the cans and below the lower edges of the end flaps inserted between the can rows.

References Cited in the file of this patent
UNITED STATES PATENTS
2,931,152    Arneson _____ Apr. 5, 1960